US009562662B2

(12) United States Patent
Lin et al.

(10) Patent No.: US 9,562,662 B2
(45) Date of Patent: *Feb. 7, 2017

(54) VEHICLE HEADLIGHT AND ALERT SYSTEM

(71) Applicant: I/O Controls Corporation, Azusa, CA (US)

(72) Inventors: Jerry Lin, Rowland Heights, CA (US); Yongchang Wang, Diamond Bar, CA (US); Ren-Cheng Chao, Taoyuan (TW); Chin-Tin Hsiao, Taoyuan (TW); Chih-Li Wang, New Taipei (TW)

(73) Assignee: I/O Controls Corporation, Azusa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,376

(22) Filed: Mar. 30, 2015

(65) Prior Publication Data
US 2015/0338045 A1  Nov. 26, 2015

Related U.S. Application Data

(63) Continuation of application No. 13/366,250, filed on Feb. 3, 2012, now Pat. No. 8,992,056.

(51) Int. Cl.
*F21S 8/10* (2006.01)
*B60Q 1/12* (2006.01)
*B60Q 5/00* (2006.01)
*F21Y 101/00* (2016.01)

(52) U.S. Cl.
CPC ............. *F21S 48/1225* (2013.01); *B60Q 1/12* (2013.01); *B60Q 5/005* (2013.01); *F21S 48/115* (2013.01); *F21Y 2101/00* (2013.01)

(58) Field of Classification Search
CPC .............................. F21S 48/1225; B60Q 1/12
See application file for complete search history.

(56) References Cited

U.S. PATENT DOCUMENTS

| 4,985,816 | A | 1/1991 | Seko et al. |
| 5,499,168 | A | 3/1996 | Cochard et al. |
| 5,562,336 | A | 10/1996 | Gotou |

(Continued)

FOREIGN PATENT DOCUMENTS

WO    2010125325    11/2010

OTHER PUBLICATIONS

Model 6130 4.5" Round LED High Beam & Low Beam Headlights, Product Brochure, J.W. Speaker Corp., printed Mar. 2011, 3 pages.

(Continued)

*Primary Examiner* — Elmito Breval
(74) *Attorney, Agent, or Firm* — Irell & Manella LLP

(57) ABSTRACT

A vehicle headlight and control system for a bus or large vehicle includes a headlight fixture with a center or low beam light source and side illumination light source operated independently. The side illumination light source may be activated when the vehicle is turning, as detected by the vehicle speed and steering shaft turn angle, to provide supplemental illumination. Both right and left side illumination sources may be provided, and may comprise LED light elements. The system may also include an audible sound generator to alert pedestrians when the vehicle is turning.

20 Claims, 16 Drawing Sheets

(56) References Cited

U.S. PATENT DOCUMENTS

| | | | |
|---|---|---|---|
| 5,567,032 | A | 10/1996 | Heizmann |
| 5,660,454 | A | 8/1997 | Mori et al. |
| 5,938,319 | A | 8/1999 | Hege |
| 6,281,632 | B1 | 8/2001 | Stam et al. |
| 6,304,175 | B1 | 10/2001 | Patrick |
| 6,481,876 | B2 | 11/2002 | Hayami et al. |
| 6,497,503 | B1 | 12/2002 | Dassanayake et al. |
| 6,752,508 | B2 | 6/2004 | Kobayashi |
| 6,805,472 | B2 | 10/2004 | Fukawa |
| 7,070,310 | B2 | 7/2006 | Pond et al. |
| 7,156,542 | B2 | 1/2007 | Miller et al. |
| 7,261,448 | B2 * | 8/2007 | Ishida ............... B60Q 1/0041 362/464 |
| 7,783,399 | B1 | 8/2010 | Young et al. |
| 7,815,352 | B2 | 10/2010 | Naganawa et al. |
| 7,824,076 | B2 | 11/2010 | Koester |
| 7,896,512 | B2 | 3/2011 | Tatara et al. |
| 2007/0120661 | A1 | 5/2007 | Ponziani |
| 2008/0007180 | A1 | 1/2008 | Kesterson |

OTHER PUBLICATIONS

Model 8700 7" Round LED Headlight, Product Brochure, J.W. Speaker Corp., printed Mar. 2011, 3 pages.
Model 8800 4"×6" Rectangular LED High Beam & Low Beam Headlights, Product Brochure, J.W. Speaker Corp., printed Mar. 2011, 3 pages.
Model 8704 7" Round (PAR 56) LED Headlight in Panel Mount Bucket, Product Brochure, J.W. Speaker Corp., printed Dec. 2011, 2 pages.
PCT Search Report and Written Opinion for PCT/US13/24666 dated May 14, 2013, 10 pages.

* cited by examiner

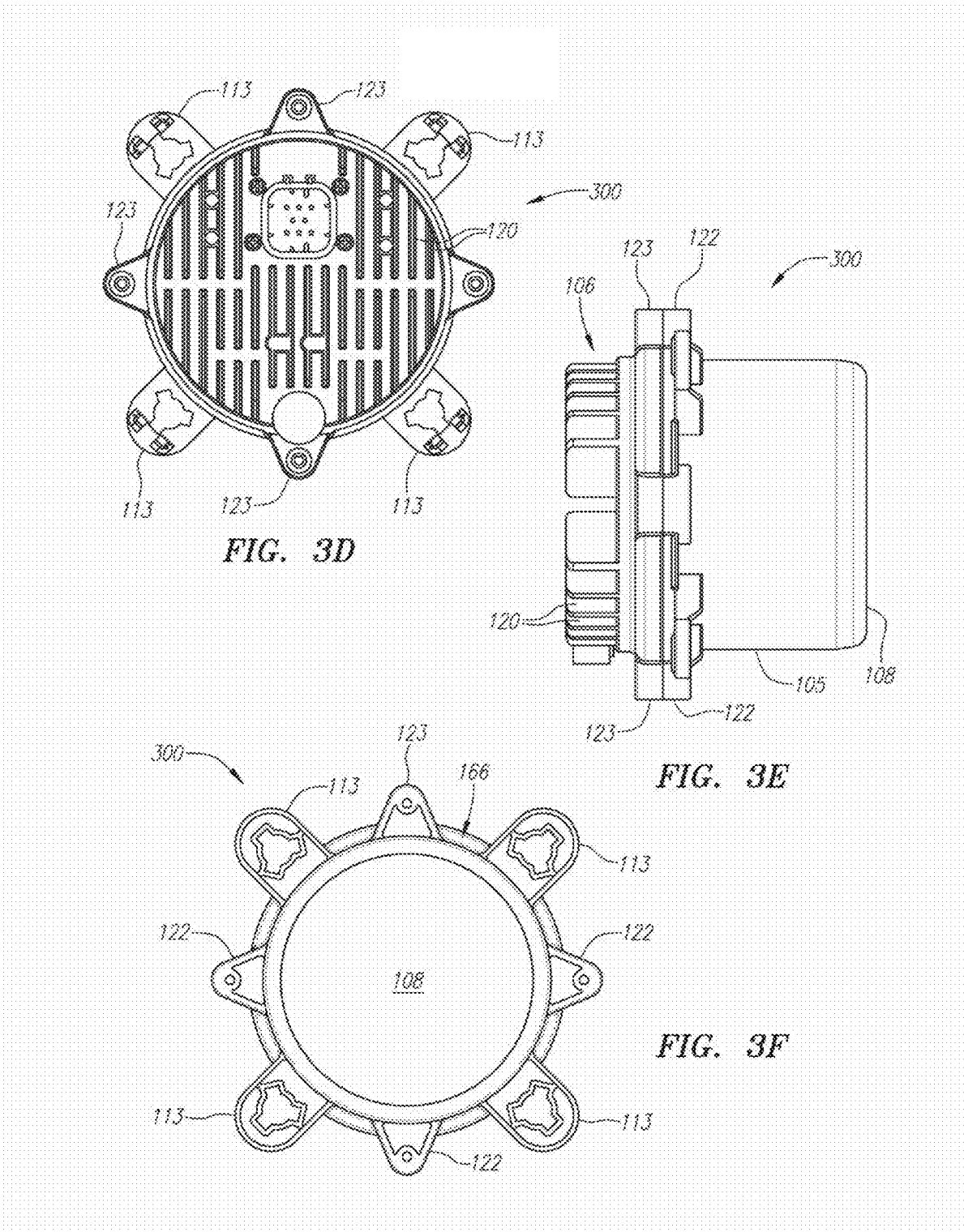

VEHICLE HEADLIGHT AND ALERT SYSTEM

RELATED APPLICATION INFORMATION

This application is a continuation of U.S. application Ser. No. 13/366,250, filed Feb. 3, 2012, hereby incorporated by reference in its entirety as if set forth fully herein.

BACKGROUND OF THE INVENTION

1) Field of the Invention

The field of the present invention generally relates to lighting systems and, more particularly, to a vehicle headlight and control system as may be used in connection with, among other things, large vehicles and conveyances such as buses, trucks, streetcars, and the like.

2) Background

Proper road illumination is an important factor in allowing drivers to identify potential road hazards. Transit vehicles, trucks and other large vehicles or conveyances generally employ headlights for providing illumination at nighttime, dusk or in other situations of reduced visibility. Such headlights are typically forward-facing and thus illuminate primarily in a forward direction, but with some spread of light fanning out slightly towards either side. Vehicle headlights commonly include low beams used for general purposes, and high beams that may be manually activated in situations requiring additional illumination.

Because glare from headlights may adversely affect oncoming traffic, transportation regulatory authorities dictate the extent to which headlight illumination can spread outward, both in terms of angular spread and intensity. Headlight manufacturers generally must comply with such regulations and design headlight illumination patterns accordingly.

For large vehicles, such as buses and trucks, drivers are more prone to experiencing blind spots while driving or maneuvering. This may occur, for example, where a bus driver attempts to make a right turn. The driver may have a difficult time spotting pedestrians crossing a street, or about to cross a street, particularly at nighttime, dusk or other low light situations. Likewise, a pedestrian may be unaware that a bus or other large vehicle is about to make a turn across the path where the pedestrian is walking. This lack of visibility presents a potentially dangerous situation in which serious injuries can occur. Since buses spend considerable time navigating in crowded urban settings, they are at higher risk for encountering these potential situations. While these problems are more significant for buses and other large vehicles, they are also experienced albeit to a lesser degree with smaller vehicles as well.

Some attempts have been proposed for improving side visibility when a vehicle is in the process of turning. For example, under one approach, a headlight reflector is mechanically tilted sideways as a vehicle turns, based on a detected steering wheel angle. While this approach may improve visibility during turning, it requires a mechanical means to tilt the headlight reflector, and mechanical parts can be prone to wear and tear or mechanical failure, typically require an electronic control means, and can increase the cost of a headlight unit. Also, merely adding side illumination may be insufficient to warn pedestrians that a vehicle is about to, or in the process of, making a turn.

Other related approaches include the provision of additional lighting sources to supplement the amount of light provided at a side angle as the vehicle turns. However, those additional lighting sources may involve additional lighting fixtures or units, thus increasing cost and complexity.

In addition, many headlights are based on halogen or high-intensity discharge (HID) light sources. These light sources may have certain drawbacks, such as excessive energy consumption or frequent replacement requirements.

Although prior attempts have attempted to solve the aforementioned problems, they are either costly, complex, incomplete, or inadequate particularly for larger vehicles. It would therefore be advantageous to provide a vehicle headlight and control system that solves one or more of the aforementioned problems, and/or is less complex or costly, more reliable, more energy efficient, longer lasting, and well suited for use in larger vehicles.

SUMMARY OF THE INVENTION

In one aspect, embodiments of the invention as disclosed herein are generally directed to a novel and versatile lighting system that is particularly well suited for a bus, transit vehicle or similar conveyance, but which may find other uses or applications as well.

According to one embodiment as disclosed herein, a vehicle headlight and related control system for a transit vehicle includes a fixture with a plurality of light sources, which may be LED-based light sources. The fixture may include one or more center low beam light sources, and one or more conditional light sources that are activated when the vehicle is turning or at other appropriate times. In a preferred embodiment, the headlight fixture includes right and left light sources that are oriented at a side angle, and individually activated as appropriate as the vehicle turns right or left.

In a preferred embodiment, a control system selectively activates the right and left light sources when the vehicle is in the process of a turning. A detection unit in proximity to the steering column of the vehicle detects a turning angle and relays that information to a controller. The controller activates the right-facing light source(s) in one or both headlights when the steering wheel has reached a first turning angle (relative to a zero angle) towards the right direction, and activates the left-facing light source(s) in one or both headlights when the steering wheel has reached a second turning angle (relative to a zero angle) towards the left direction. The first turning angle and second turning angle may be selected to be the same. The controller also deactivates the right-facing or left-facing light source(s), as the case may be, once the steering wheel has returned towards a central or forward-facing position. In addition to the steering wheel turning angle, the controller may also take account of the vehicle's speed or change in speed in determining whether to activate or deactivate the right-facing or left-facing light sources.

The control system is also preferably used to control the lowbeam operation of the headlights, and may further be utilized to control a highbeam lighting source, whether integrated with the same headlight fixture or provided as a separate fixture.

In other embodiments, a vehicle headlight control system may further be configured to include a pedestrian alert system. In one embodiment, the pedestrian alert system includes an audible warning system with an external sound source on either side of the vehicle. The external sound source may be activated when the vehicle is in the process of turning at an intersection or corner, for example at or around the same time that the additional light sources for extra turning illumination are activated. The external sound source may be controlled by the same control mechanism as the vehicle headlights.

Further embodiments, variations and enhancements are also disclosed herein.

BRIEF DESCRIPTION OF THE DRAWINGS

FIGS. 3D, 3E and 3F are a rear view, side view, and front view respectively of the vehicle headlight fixture illustrated in FIG. 3B.

DETAILED DESCRIPTION OF PREFERRED EMBODIMENT(S)

According to various embodiments as disclosed herein, an adaptive headlight and control system for a bus, transit vehicle, or other conveyance may comprise, for example, a fixture having a plurality of light sources, each of which preferably comprise one more light-emitting diodes (LEDs) or similar lighting elements, controlled in a manner so as to provide effective illumination when a vehicle is making a relatively sharp turn such as at an intersection or corner. The fixture may include one or more center low beam light sources and one or more angled light sources that are selectively activated when the vehicle is turning relatively sharply, or at other appropriate times. The headlight fixture may optionally also include a highbeam light source, or may be used in conjunction with a separate highbeam lighting fixture.

In a preferred embodiment, the headlight fixture includes right and left LED-based light sources that are oriented at a side angle, and individually activated as appropriate as the vehicle turns right or left in a relatively sharp manner. In one or more embodiments, a control system selectively activates the right-facing light source on one or both headlights when the vehicle is in the process of a turning relatively sharply in a rightward direction, and the left-facing light source on one or both headlights when the vehicle is in the process of turning relatively sharply in a leftward direction. The system is preferably outfitted with a detection unit for detecting a vehicle turning angle and relays that information to a controller, which in turn selectively activates and deactivates the right and left light sources in one or both headlights as needed. In determining whether the vehicle is making a turn at an intersection or corner, the controller may take account of the vehicle's or steering wheel's turning angle as well as the vehicle's speed or change in speed, and thereby determining whether to activate or deactivate the right or left light sources.

The vehicle headlight control system may optionally be configured to include a pedestrian alert system having, for example, an audible warning system with an external sound source on either side of the vehicle. The external sound source on a given side may be selectively activated when the vehicle is in the process of turning in that direction at an intersection or corner, and may be activated at or around the same time that the additional light sources for extra turning illumination are activated.

Embodiments as disclosed herein may provide an adaptive front-lighting system which substantially improves vision in a direction of travel, particularly when turning at an intersection or corner for example. In one or more preferred embodiments, an adaptive headlight system comprises a number of LED-based light sources that are selectively activated to provide low-beam operation and enhanced side illumination when turning, as well as optionally high-beam operation and illumination.

Figure 1:
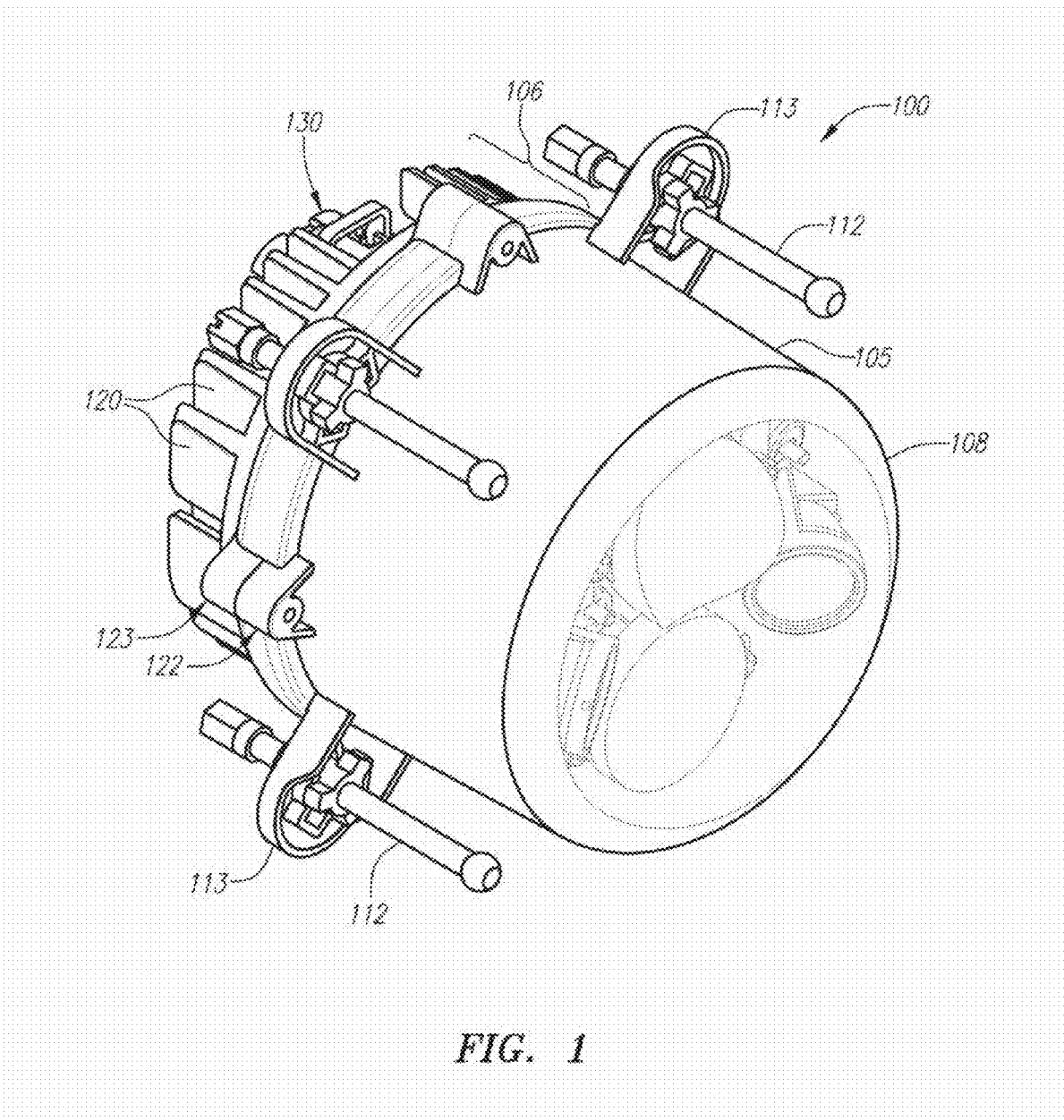
FIG. 1 is a diagram illustrating a perspective view of an example of a vehicle headlight fixture in accordance with one embodiment as disclosed herein.

FIG. 1 is a diagram illustrating an example of a vehicle headlight fixture 100 in perspective view, in accordance with one embodiment as disclosed herein. In FIG. 1, the vehicle headlight fixture 100 is shown as assembled, in a manner that may be suitable for installation in a vehicle such as a bus or transit vehicle for example. The headlight fixture 100 in this example includes a base portion 106 on which, as illustrated in diagrams described hereafter, the various lighting elements are mounted. The base portion 106 in this example is generally disc-shaped, with heat dissipating fins 120 disposed on the rear side along with an electrical connector 130. The headlight fixture 100 further includes a cover housing 105 that is, in this example, generally cylindrical in shape (although other shapes are possible as well), designed to enclose and seal the lighting components of the headlight fixture 100 in an installable unit. At the front end over the cover housing 105 is disposed a transparent cover 108 that may be, e.g., glass or transparent plastic, polymer or polycarbonate, or any other suitable material used in connection with vehicle headlights. The transparent cover 108 may be attached by screwing on to threaded grooves (not shown) on the interior of the cover housing 105, or else by screws (not shown), or by any other suitable or conventional means.

The cover housing 105 and other exposed regions of the headlight fixture 100 are preferably made of durable material, such as aluminum, metal alloy, or combinations thereof with carbon fiber or plastic components, suitable to withstand daily wear when disposed in a vehicle, including vibration, shock and environmental influences. The entire headlight fixture 100 is preferably designed in size and shape suitable for use as a headlight on a bus or transit vehicle, or any other vehicle for which it may find application.

Figures 3A, 3B, 3C:
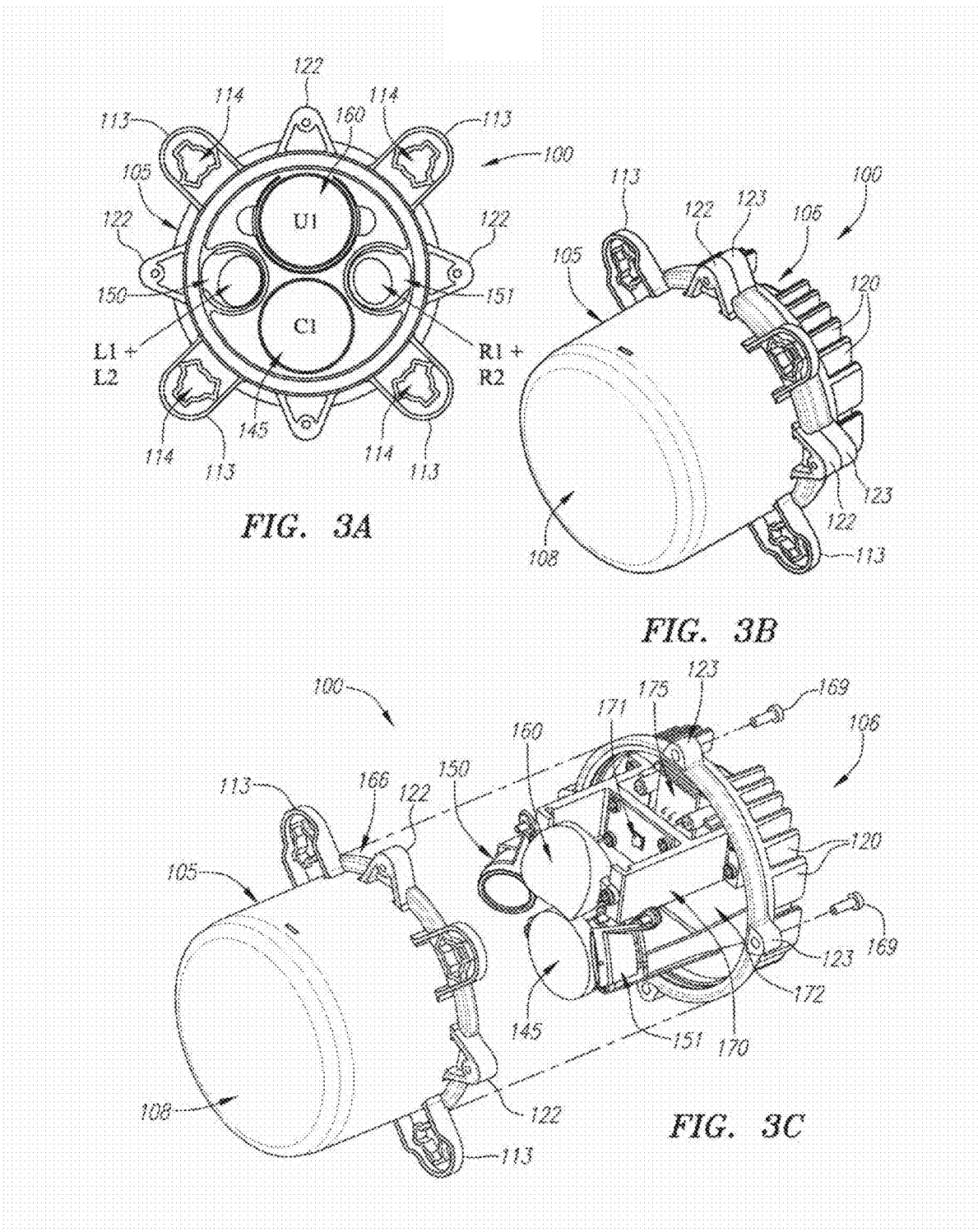
FIG. 3A is a diagram illustrating a front view of a vehicle headlight fixture similar to the embodiment of FIG. 1, without the cover lens in place, with another variation in arrangement of the lighting sources.
FIGS. 3B and 3C are perspective views of the vehicle headlight fixture of FIG. 3A as assembled together with a cover portion, with FIG. 3C showing an assembly diagram of separate components of the vehicle headlight fixture.

As also shown in FIGS. 3A-3C, the base portion 106 of the headlight fixture 100 preferably includes a plurality of connection members 123, in this case located around the periphery of the base portion, while the cover housing 105 likewise has a plurality of connection members 122 disposed around the periphery of the rear part of the cover housing 105, that generally align with the connection members 123 of the base portion 106. In this manner, the cover housing 105 may be suitably attached to the base portion 106 using screws or other attachment means.

The headlight fixture 100 may further have connection members 113 for facilitating the attachment of the fixture to an appropriate location at the front of the vehicle, in a headlight well or similar location, by means of appropriate screws 112 or other similar means. In this example, the connection members 113 are disposed around the periphery of the rear part of the cover housing 105, alternating with the other connection members 122. Other alternative means for attaching the headlight fixture 100 to a vehicle may be used as well.

Figure 2:
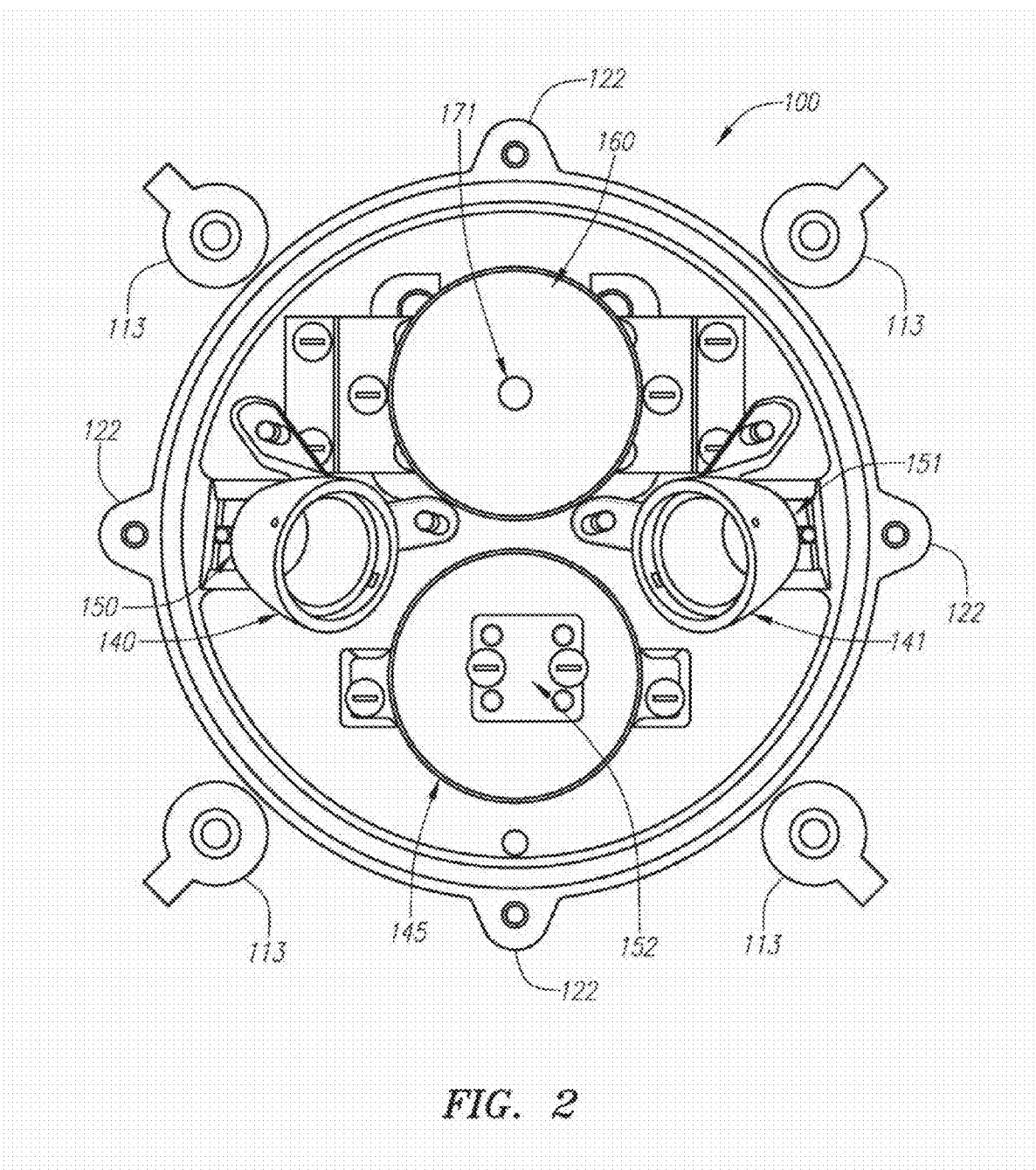
FIG. 2 is a diagram illustrating a front view of the vehicle headlight fixture of FIG. 1.
Figure 9:
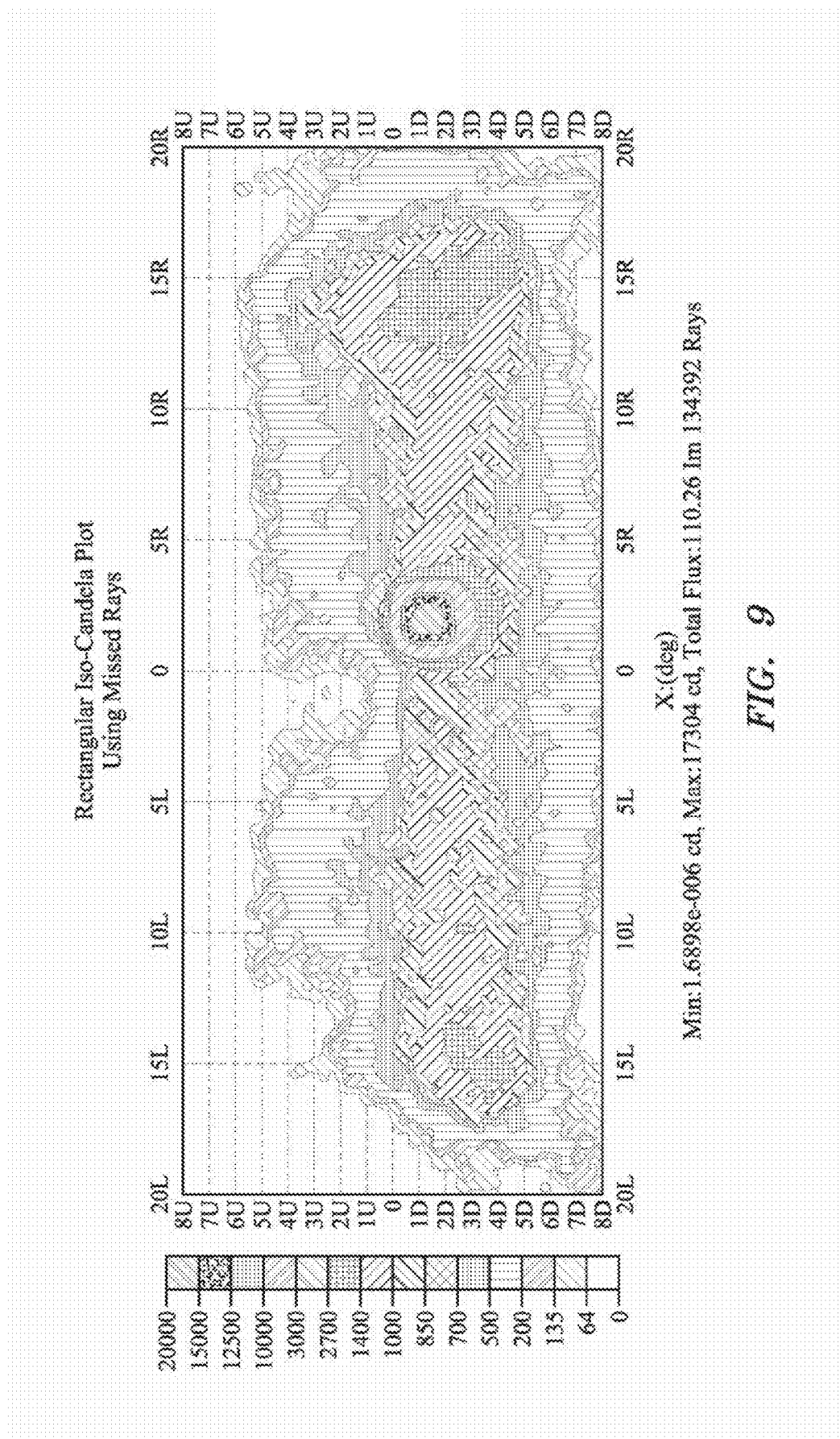
FIG. 9 is a photometry diagram showing an example of a light beam pattern of an embodiment of a vehicle headlight operating in normal lowbeam mode.

Additional details are shown in FIG. 2, which is a front view diagram of the vehicle headlight fixture 100 of FIG. 1. As shown in FIG. 2, the lighting fixture 100 may include a center forward-facing low beam light source 152, and a second low beam light source 171 which, in this example, is directed towards a lens 160 which disperses the light in a spreading pattern outwards at a predefined angle, and also directs the spread light downwards. Preferably, the combination of light sources 145 and 148 combine to provide a complete low beam lighting pattern that is substantially in compliance with applicable regulatory requirements for low beam lighting. Lens 160 may be, for example, a biconcave variety with attributes selected so as to achieve a beam pattern similar to that shown in FIG. 9, or any other suitable variety of lens. As an alternative to using a lens 160 to spread and redirect the light from light source 171, other means may be used to achieve a similar result; for example, the light source may be pointed downwards towards an angled reflector, which disperses the light in a spreading pattern outwards at a slight angle, and generally directed slightly towards the ground.

In a preferred embodiment, the light sources 152 and 171 are LED based light sources, and may each comprise "super-bright" LED lighting elements of sufficient luminosity to provide illumination out to the required distance of visibility for conventional lowbeam operation. Suitable LEDs may be obtained, for example, from Philips Lumileds Lighting Company, or other providers, and may be sold under the tradenames such as Luxeon® Altilon. Such LEDs may be 7.0 Watts, 13.7 Watts, or any other suitable power rating. The LEDs may be cool white in color, close to daylight in color temperature, to enhance their projection distance and maximize visibility. In alternative embodiments, other numbers and arrangements of LEDs may be used in order to obtain the desired intensity and beam spread pattern.

As further illustrated in FIG. 2, the lighting fixture may additionally include a pair of side-mounted angled lighting units 150, 151 that are selectively activated to provide illumination during vehicle turns or in other appropriate circumstances. In this example, each lighting unit 150, 151 comprises a generally cylindrical housing, as illustrated in FIG. 2, for channeling light generated by the lighting sources 140, 141, and each is oriented at a fixed angle with respect to the back plane of the lighting fixture and slightly downward (although they may also be level), such that the lighting sources 140, 141 in the lighting units 150, 151 shed their light at a partial side angle to the left or right direction of the vehicle (i.e., at an acute angle relative to the main projected beam from center light source 152). The light sources 140, 141 are preferably LED light sources, and may each may again comprise "super-bright" LED lighting elements of sufficient luminosity to provide illumination out to the required distance of visibility for the turning operation. As with the lowbeam LEDs, the LEDs used for light sources 140, 141 may be cool white in color, close to daylight, to enhance their projection distance and maximize visibility. The light sources 140, 141 may come pre-mounted or else may be mounted on a suitable mounting surface.

FIGS. 3A through 3E provide further details of the vehicle headlight fixture 100, with and without the cover 109 attached. FIG. 3A is a diagram illustrating a front view of the vehicle headlight fixture 100, without the cover lens in place, showing again the various connection members 122 and 113 disposed around the periphery of the rear part of the cover housing 105. Similar to FIG. 2, the headlight fixture 100 includes a first center light source (shown as 152 in FIG. 2) disposed behind a forward-facing lens 145 for lowbeam operation, along with a second forward-facing light source 171 whose output is adjusted in terms of beam direction and/or spread by lens 160, so as to provide some outward spread of light and also face slightly downwards towards the roadway. As before, the combined lighting pattern of lighting sources 145 and 171 preferably combine to provide a complete lowbeam lighting pattern in substantial compliance with applicable regulatory requirements. The headlight fixture 100 also includes a pair of side-mounted angled lighting units 150, 151 that are selectively activated to provide illumination during vehicle turns or in other appropriate circumstances.

FIG. 3C is an assembly view diagram showing some of the separate components of the vehicle headlight fixture 100 illustrated in FIGS. 3A and 3B. In FIG. 3C, the cover housing 105 is substantially similar to that shown in FIGS. 1 and 2, with the connection members 122 and 113 around the periphery of the rear portion of the cover housing 105, which further has a lip 166 disposed around the outer edge to enhance sealing of the components within the headlight fixture 100. The base portion 106 also resembles that of FIG.

1. As can be seen in FIG. 3C, the base portion 106 of the cover housing includes a mounting element 170 in the form of an H-bracket or similar structure, with lighting element 171 mounted on a cross-beam of mounting element 170 and the lens 160 mounted at the terminating end of the H-bracket mounting element 170. As noted previously, the lens 160 may be, for example, a biconcave variety with attributes selected so as to achieve a beam pattern similar to that shown in FIG. 9, or any other suitable variety of lens. A perpendicular mounting platform 172 may be provided for additional support of the mounting element 170, and may include right and left projecting arms for holding the cylindrical housings of the angled side-mounted lighting units 150, 151. FIG. 3C also illustrates the screws 169 that may be used as attachment means to connect together the base portion 106 and the cover housing 105. FIG. 3B illustrates the unit as assembled, which appears substantially the same in outward appearance as the fixture 100 illustrated in FIG. 1.

FIGS. 3D, 3E and 3F are a rear view, side view, and front view respectively of the vehicle headlight fixture 100 illustrated in FIG. 3B, as fully assembled, with the cover lens 108 in place.

Figure 15:
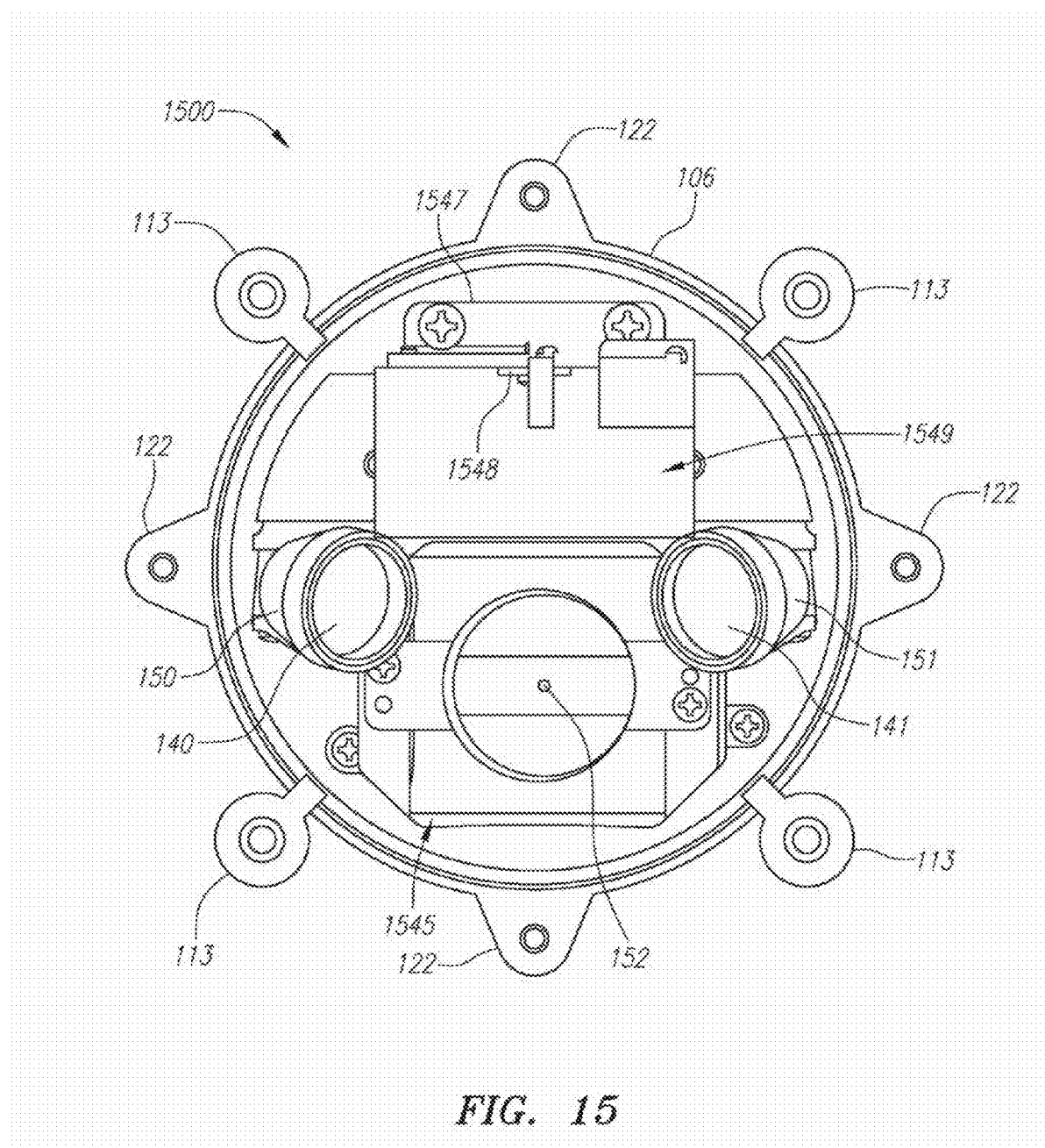
FIG. 15 is a diagram illustrating another embodiment of a vehicle headlight fixture, in front view.

FIG. 15 is a diagram illustrating an example of another embodiment of vehicle headlight fixture 1500, in front view (similar to FIG. 2). For convenience, elements similar or analogous in function and form with those in the embodiment of FIGS. 1 and 2 have been numbered similarly in FIG. 15. The main difference in the embodiment of FIG. 15 is that the upper light source 1548, instead of being directed forwardly, instead is mounted to the bottom surface of a protruding L-shaped bracket 1547, and is facing downwards. The bracket 1547 is secured also to the base 106 of the cover shell by, e.g., screws or other fastening means. Light from the upper light source 1548, which may be embodied as a light-emitting diode for example, is directed downwards towards an angled reflector plate 1549 that disperses the light in a spreading pattern outwards at a slight angle, and generally directed slightly towards the ground. As with the prior embodiment, the lower light source 152 directs its light forwardly towards, e.g., a lens (depicted in FIG. 15 as framed lens 1545). Preferably, the combination of light sources 1548 and 152 combine to provide a complete low beam lighting pattern similar to FIG. 9 and that is substantially in compliance with applicable regulatory requirements for low beam sources.

A variety of other light source arrangements and configurations may alternatively be utilized to generate the low beam or, in some cases, the other beam patterns disclosed herein.

Figure 4:
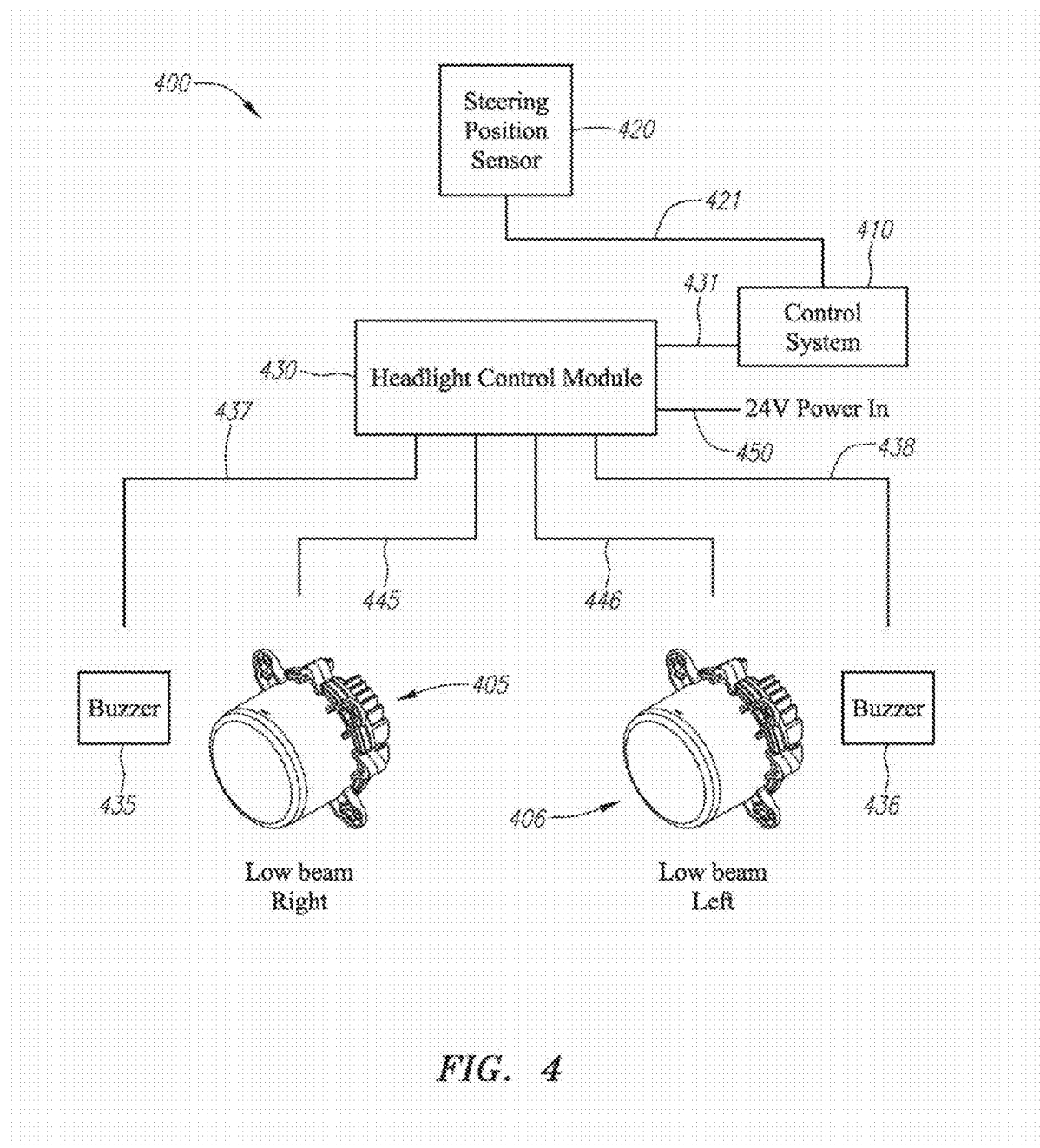
FIG. 4 is a block diagram of a vehicle headlight control and warning system in accordance with one embodiment as disclosed herein.

As noted previously, the headlight fixture in accordance with the embodiments disclosed herein is preferably used in connection with a bus or other large vehicle (although it may find use in smaller vehicles or other settings as well); in such a case, a pair of right and left headlight fixtures may be advantageously operated so as to provide suitable side-illumination to a driver of a vehicle when turning at an intersection or corner, for example. FIG. 4 is a block diagram of a vehicle headlight control and warning system 400 in accordance with one embodiment as disclosed herein, meeting such a purpose. In FIG. 4, a right headlight fixture 405 and a left headlight fixture 406 are operably coupled to a headlight control module 430, and controlled via control signals 445, 446 respectively. The right and left headlight fixtures 405, 406 may each be embodied in the form of the headlight fixture illustrated in FIG. 1-2 or 3A-3F, or any other suitable embodiment. The right and left headlight fixtures 405, 406 preferably include both lowbeam lights and conditionally activated side illumination lights, although they may also include highbeam lights or other combinations of lighting elements.

The headlight control module 430 receives an incoming power supply signal 450 which may be, for example, a 24-Volt input derived from the vehicle's battery. The headlight control module 430 also preferably receives a control signal (or set of control signals) 421 from a vehicle control system 410. The vehicle control system receives a steering position sensor signal 421 generated by a steering position sensor 420. The vehicle control system 410 may include a number of vehicle control modules that, for instance, provide control, sensor, indicator, or diagnostic information for various systems including the lighting system, dashboard indicators, braking system or sensors, engine/speed controls or sensors, door controls and sensors, and the like. In other embodiments, the steering position sensor signal 421 may bypass the vehicle control system 410 and be provided to the headlight control module 430, in the case where the latter includes the control and logic functionality described in more detail below.

The headlight control and warning system 400 of FIG. 4 further includes a pedestrian alert function operable through the headlight control module 430. As part of the pedestrian alert function, a right side audible sound generator 435 and a left side audible sound generator 436 are disposed on the right and left sides of the vehicle, respectively, and may be activated at appropriate times to alert pedestrians that the vehicle is turning at an intersection or corner. The audible sound generators 435, 436 may, for example, each constitute a buzzer or chime that is controlled via the headlight control module 430, and they may be used in conjunction with other alert indicators including flashing lights.

In operation, the control system 410 receives (by polling or otherwise) periodic indications of the turn angle of the vehicle via the steering position sensor signal 421 from the steering position sensor 420. The control system 410 may also optionally receive a speed indication signal (not shown) and, based on the vehicle speed over a period of time, calculate the vehicle's acceleration or deceleration in a straightforward manner. The control system 410 delivers control signal(s) 431 to the headlight control module 430 to control operation of the right and left headlight fixtures 405, 406 as well as the audible sound generators 435, 436 by activating and deactivating them in accordance with the operation of the vehicle. For example, the control system 410 may instruct the headlight control module 430 to activate the low beam lights in the right and left headlight fixtures 405, 406 in response to a manual switch setting controlled by the vehicle driver. Further, in a preferred embodiment, the control system 410 determines, based at least on the turning angle of the vehicle (as indicated by the steering position sensor signal 420), whether the vehicle is turning at an intersection or corner, and if so issues control signal(s) 431 to the headlight control module to activate the side illumination lights of the right and/or left headlight fixtures 405, 406, and optionally the right or left audible sound generator 435 or 436.

For example, when the steering position sensor signal 421 detects that the steering wheel is turned beyond an angle indicating that the vehicle wheels are beyond a certain angular threshold (such as, e.g., 20 degrees to the right or left off the centerline, or some other programmed trigger angle), then the control system 410 may issue an activation signal to initially turn on the right-facing light elements in the right and left headlight fixtures 405, 406 if the vehicle is turning in a right direction, or to initially turn on the left-facing light elements in the right and left headlight fixtures 405, 406 if the vehicle is turning in a left direction. Preferably, the side illumination lighting elements in both right and left headlight fixtures 405, 406 are simultaneously activated to provide side illumination in the direction of the vehicle's turning, although in other embodiments only the side illumination lighting element of the lighting fixture on the side of the vehicle in the direction of the turn is activated. The side illumination lighting elements are preferably activated for the duration of the vehicle's turn. In order to prevent flicker, the control system 410 preferably imposes a suitable level of hysteresis, such that in order to deactivate the side illumination lighting elements the vehicle wheels need to cross some angle less than original threshold (for instance, 18 degrees if the original trigger angle was 20 degrees) prior to deactivating the side illumination lighting elements.

In alternative embodiments, further criteria may be employed to determine whether or not to activate the side illumination elements. For example, the control system 410 may utilize the vehicle speed, its acceleration/deceleration, and the steering position sensor signal 421 to determining whether the vehicle is turning at an intersection or corner, and if so issues control signal(s) 431 to the headlight control module to activate the side illumination lights of the right and/or left headlight fixtures 405, 406, and optionally the right or left audible sound generator 435 or 436.

As example of this operation, when the vehicle is in a low speed range (such as, e.g., less than 30 miles per hour or some other programmed speed threshold) or is in a medium speed range (such as, e.g., less than 40 miles per hour or some other programmed speed threshold) and rapidly decelerating, and when the steering position sensor signal 421 indicates that the steering wheel is turned beyond an angle such that the vehicle wheels are beyond a certain angular threshold (such as, e.g., 20 degrees to the right or left off the centerline, or some other programmed angle), then the control system 410 may issue an activation signal to initially turn on the right-facing light elements in the right and left headlight fixtures 405, 406 if the vehicle is turning in a right direction, or to initially turn on the left-facing light elements in the right and left headlight fixtures 405, 406 if the vehicle is turning in a left direction. Preferably, the side illumination lighting elements in both right and left headlight fixtures 405, 406 are simultaneously activated to provide side illumination in the direction of the vehicle's turning, although in other embodiments only the side illumination lighting element of the lighting fixture on the side of the vehicle in the direction of the turn is activated. The side illumination lighting elements are preferably activated for the duration of the vehicle's turn. In order to prevent flicker, the control system 410 preferably imposes a suitable level of hysteresis, such that in order to deactivate the side illumination lighting elements the vehicle wheels need to cross some angle less than original threshold (e.g., 18 degrees if the original trigger angle was 20 degrees) and/or must exceed the maximum speed by some additional delta. If either the required turning angle or speed is no longer met, after application of suitable hysteresis, then the control system 410 will issue a deactivation signal (or deassert an existing activation signal) for the right or left headlight fixture 405, 406 as the case may be.

Optionally, at the same time the right or left headlight fixture 405, 406 is activated during a vehicle turn, the control system 410 further instructs the headlight control module 430 to activate the audible sound generator 435 or 436 in the direction of the vehicle's turn. The audible sound generator 435 or 436 preferably generates a buzzer noise or chime in order to warn pedestrians that the vehicle is turning. In certain embodiments, the warning may be supplemented or augmented by causing the side illumination light elements of the headlight fixtures 405, 406 to flash or strobe one or more times during the vehicle's turning maneuver. The flashing or strobing operation may be a programmable option selected by modifying suitable parameters with the control system 410. The audible sound generators 435, 436 may be deactivated in tandem with the supplemental illumination provided by the headlight fixtures 405 and 406, or else may be independently deactivated after a predetermined amount of time has elapsed, or otherwise. The audible sound generators 435, 436 may also be configured so as to operate only when the vehicle is in motion, so that if the vehicle has halted the sound temporarily stops as well.

In an alternative embodiment, the vehicle is further outfitted with ultrasonic motion sensors (not shown) on either forward flank of the vehicle, near the location of the sidelights or front corner of the vehicle. The appropriate ultrasonic motion sensor is activated when the vehicle is turning relatively sharply, at an intersection or corner. If the ultrasonic motion sensor detects the presence of an individual, it then activates the appropriate right or left audible sound generator 435 or 436 as the case may be, so long as the motion is detected or alternatively for a predetermined amount of time.

In the foregoing manner, the headlight control and warning system 400 of FIG. 4 may provide both useful side illumination for the vehicle driver when turning the vehicle at an intersection or corner, as well as audible and possibly visual alerting to pedestrians who may be in proximity of the vehicle.

Figure 8:
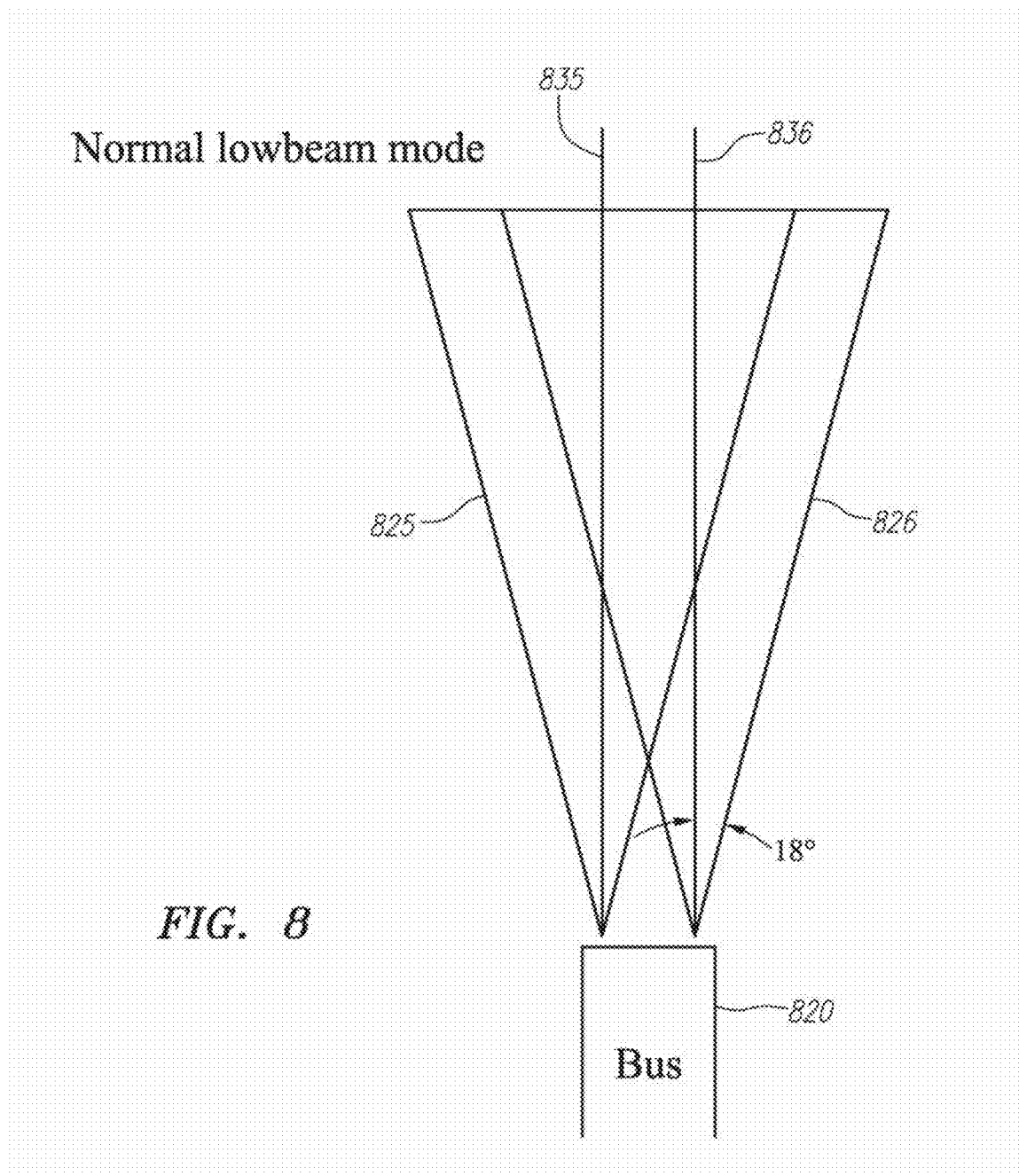
FIG. 8 is a diagram illustrating operation of a pair of vehicle headlights disposed on a vehicle in accordance with one example as disclosed herein, when the headlights are operating in normal lowbeam mode.

FIGS. 8 through 13 illustrate examples of operation of the headlight system as employed, for example, in a bus or other transit vehicle. First, FIG. 8 is a diagram illustrating operation of a pair of vehicle headlights disposed on a vehicle 820 when the headlights are operating in normal lowbeam mode. As shown in FIG. 8, the headlight beams 825, 826 are each oriented along a straight centerline 835, 836 emanating from the respective left and right headlights. In this case, the headlight beams 825, 826 each fan out in a beamspread of approximately 18 degrees to the right and left of each centerline 835, 836 according to a photometry diagram similar to the one shown in FIG. 9, to form a combined lowbeam pattern.

Figure 10:
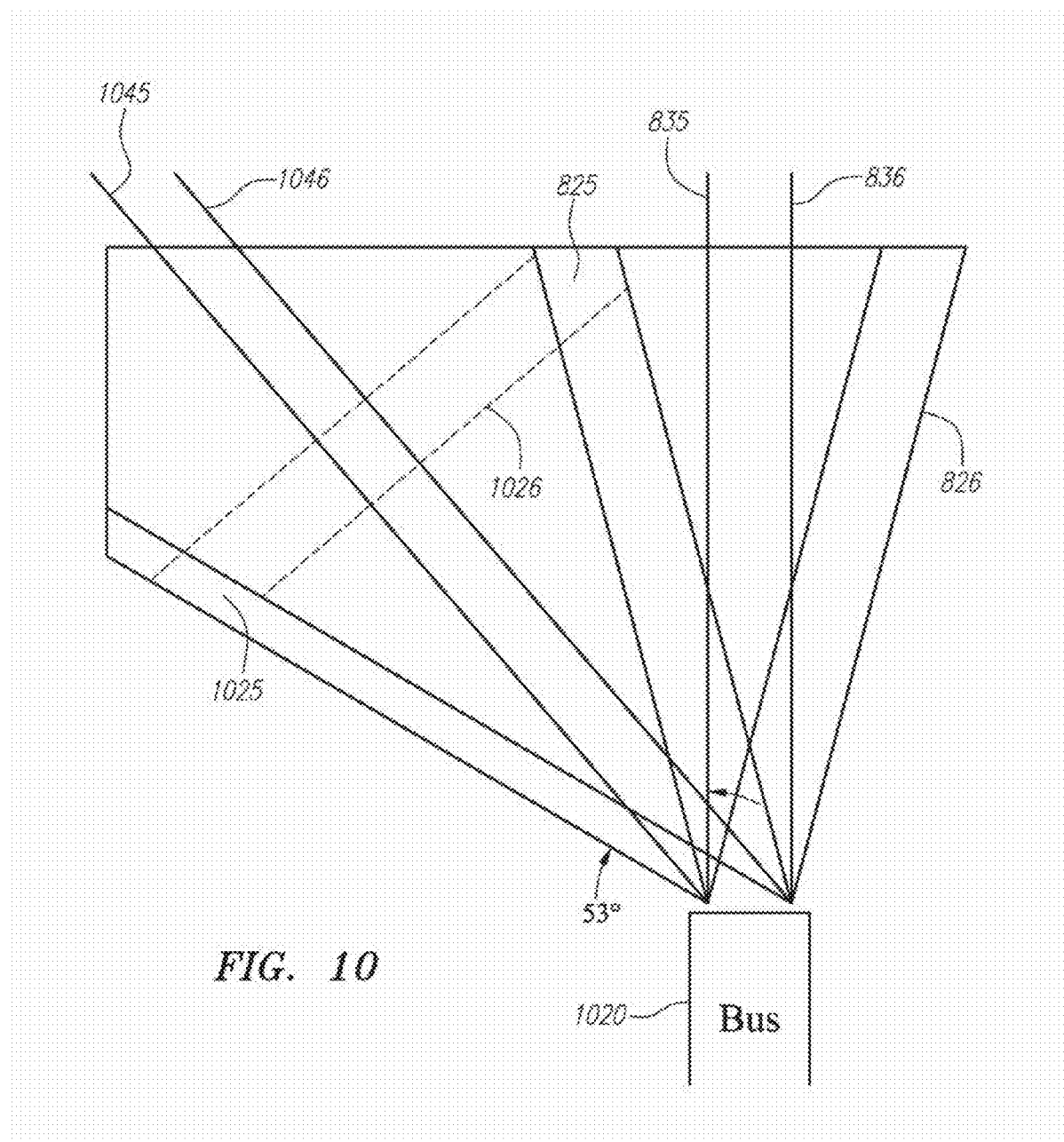
FIG. 10 is a diagram illustrating operation of a pair of vehicle headlights disposed on a vehicle in accordance with one example as disclosed herein, when the headlights are operating in a left turn mode.

FIG. 10 is a diagram illustrating operation of a pair of vehicle headlights disposed on a vehicle 1020 in accordance with an example when the headlights are operating in a left turn mode. As shown in FIG. 10, the headlights continue to produce headlight beams 825, 826 that fan out along the centerlines 835, 836 in an 18 degree spread. In addition, each of the headlights also generates a left side illumination pattern using the left-facing lighting elements of each headlight fixture, oriented along angled lines 1045 and 1046 respectively, generating additional beams 1025 and 1026 respectively. The angled lines 1045, 1046 are each offset at a predefined angle, in this case 35 degrees, such that the total beamspread to the left of the vehicle is 53 degrees (as the lightbeam 1025 along angled line 1045 spreads out an additional 18 degrees from the angled line 1045). The resulting beam pattern is similar to the one illustrated in the photometry diagram of FIG. 11 for one of the vehicle headlights operating in a left turn mode.

Figure 12:
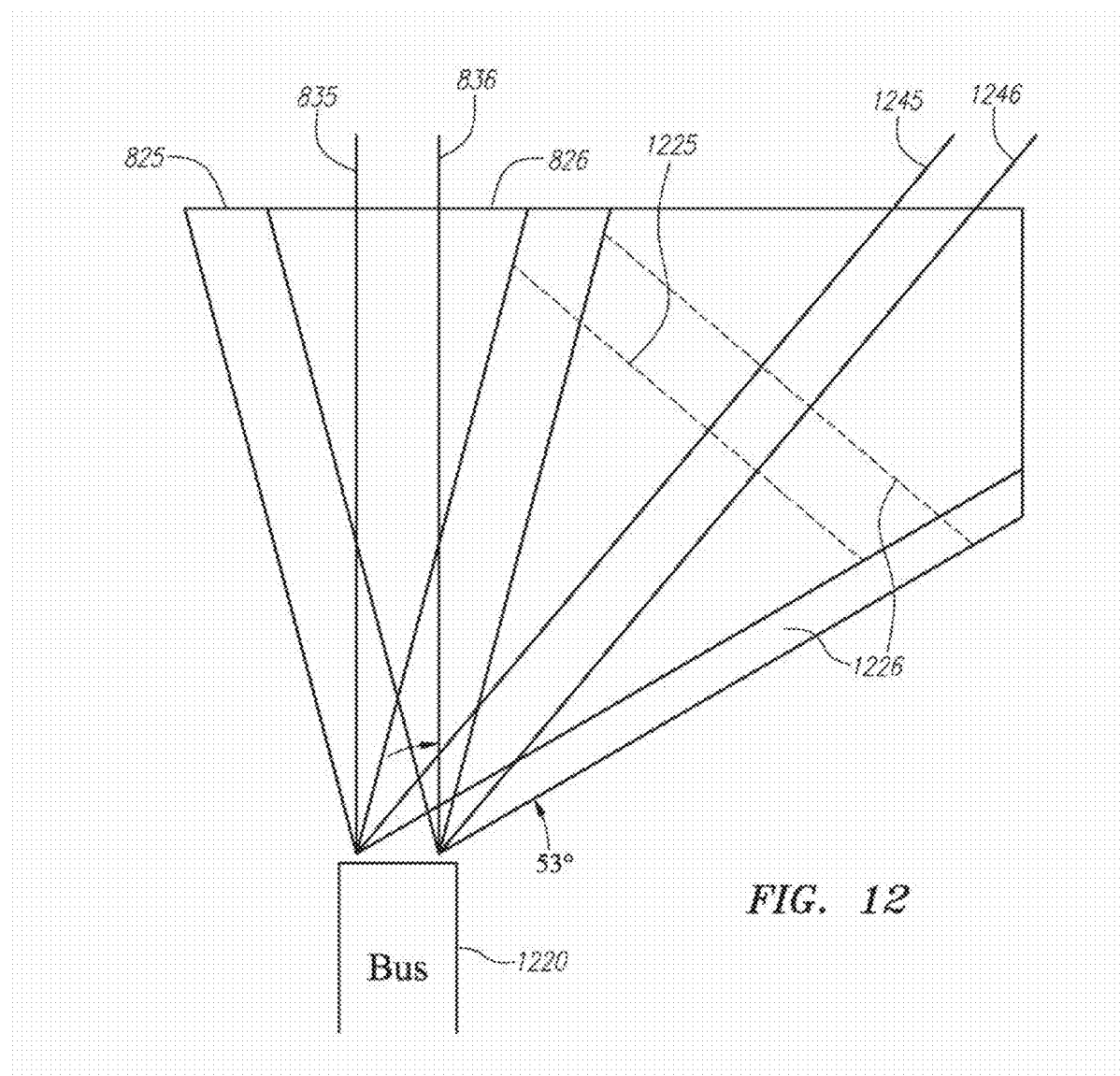
FIG. 12 is a diagram illustrating operation of a pair of vehicle headlights disposed on a vehicle in accordance with one example as disclosed herein, when the headlights are operating in a right turn mode.

Similarly, FIG. 12 is a diagram illustrating operation of a pair of vehicle headlights disposed on a vehicle 1220 in accordance with an example when the headlights are operating in a right turn mode. As shown in FIG. 12, the headlights continue to produce headlight beams 825, 826 that fan out along the centerlines 835, 836 in an 18 degree spread. In addition, each of the headlights also generates a right side illumination pattern using the right-facing lighting elements of each headlight fixture, oriented along angled lines 1245 and 1246 respectively, generating additional beams 1225 and 1226 respectively. The angled lines 1245, 1246 are each offset at a predefined angle, in this case 35 degrees, such that the total beamspread to the right of the vehicle is 53 degrees (as the lightbeam 1225 along angled line 1245 spreads out an additional 18 degrees from the angled line 1245). The resulting beam pattern is similar to the one illustrated in the photometry diagram of FIG. 13 for one of the vehicle headlights operating in a right turn mode.

Figure 11:
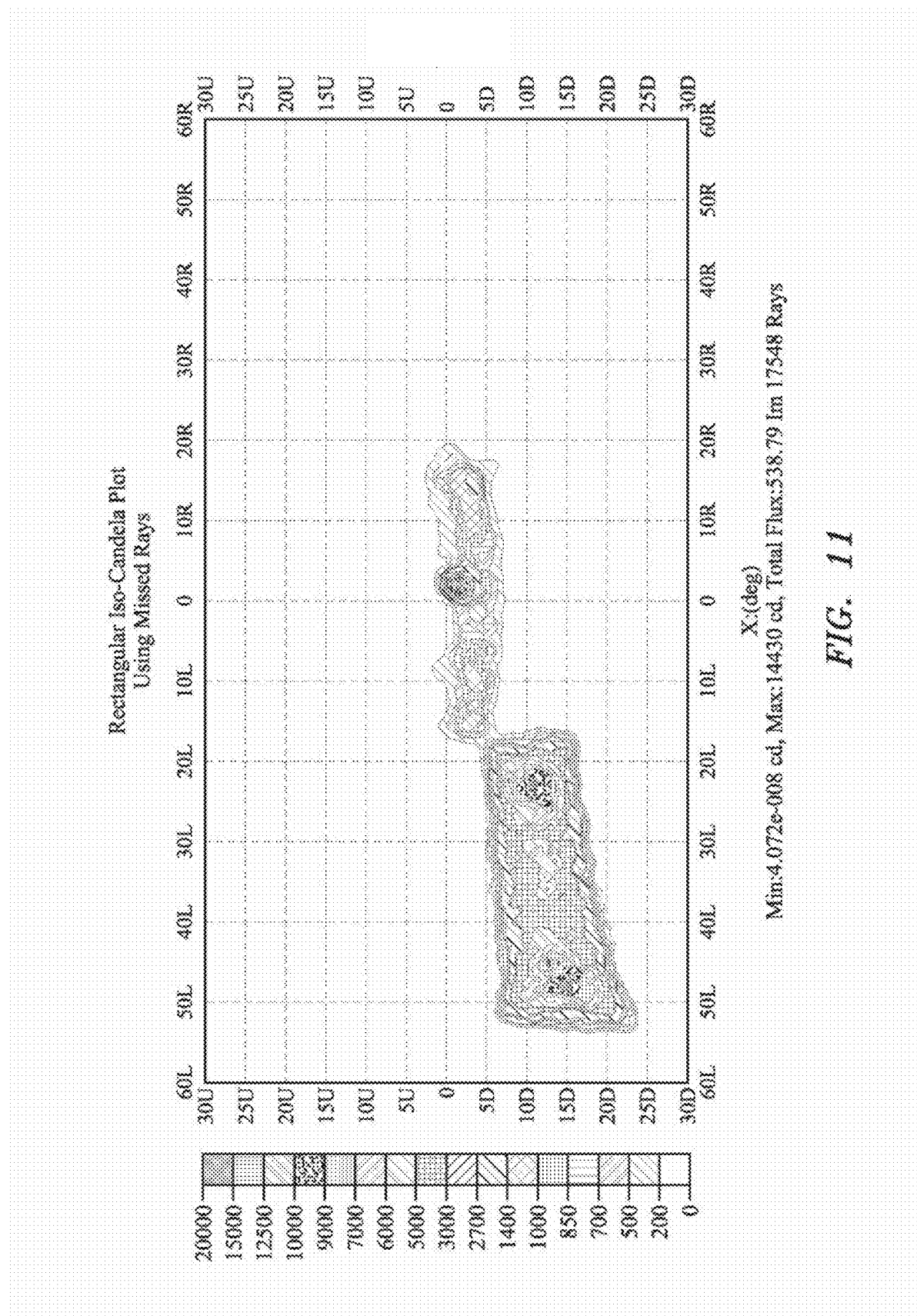
FIG. 11 is a photometry diagram showing an example of a light beam pattern of an embodiment of a vehicle headlight operating in a left turn mode.
Figure 13:
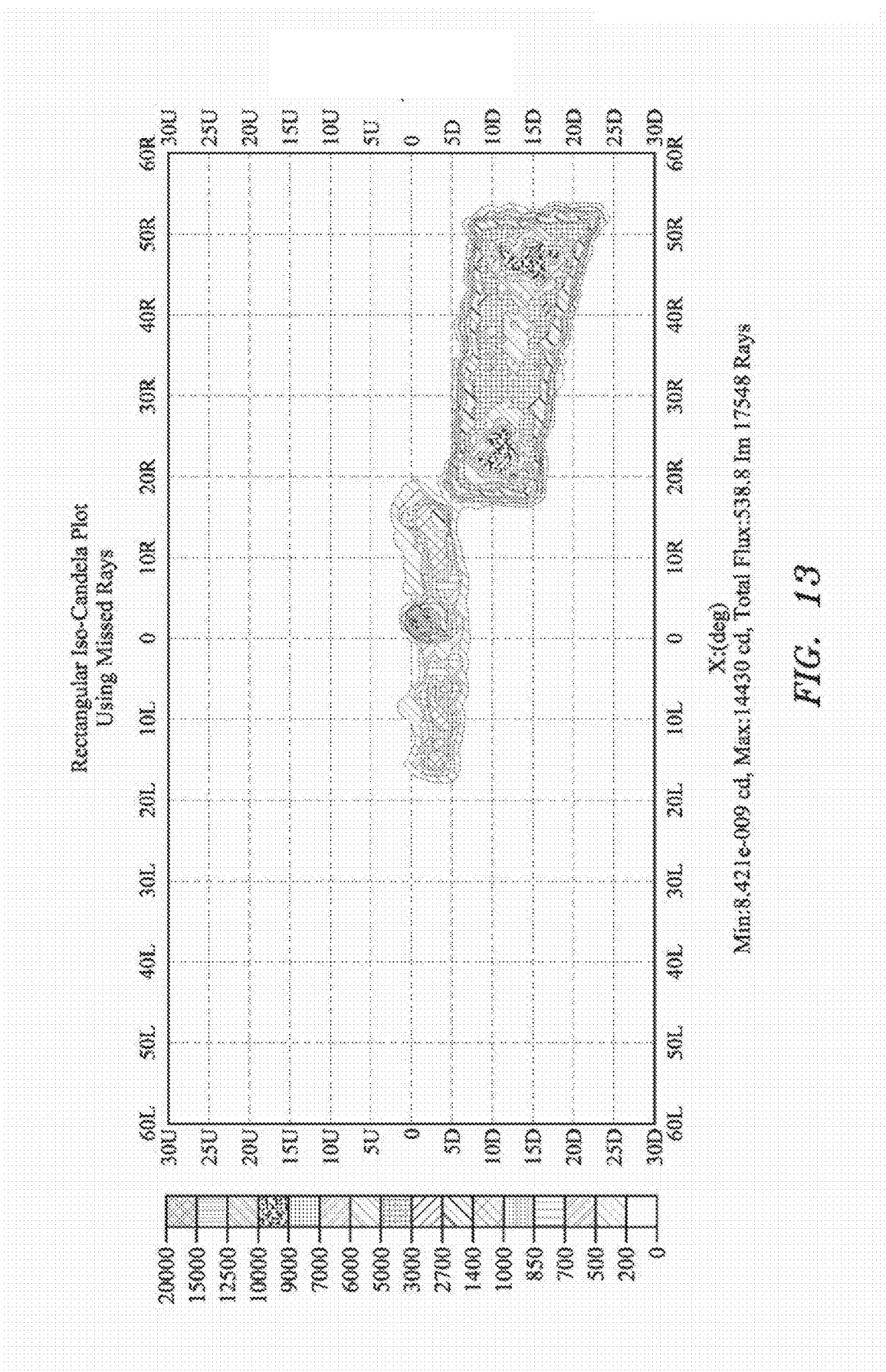
FIG. 13 is a photometry diagram showing an example of a light beam pattern of an embodiment of a vehicle headlight operating in a right turn mode.

As shown in the foregoing examples, a vehicle can be provided with supplemental illumination when turning or cornering, thereby increasing safety and driver visibility. As illustrated in FIGS. 11 and 13, the supplemental illumination can be directed in a generally downward direction, ranging from 5 degrees to nearly 25 degrees off the horizontal in this example, and gradually tapering downward with beamspread toward the outer periphery so as to reduce the possibility of interference with oncoming traffic. Of course, the beam patterns in these examples are merely illustrative and should not be taken to be specifically limiting in any manner.

Figure 5:
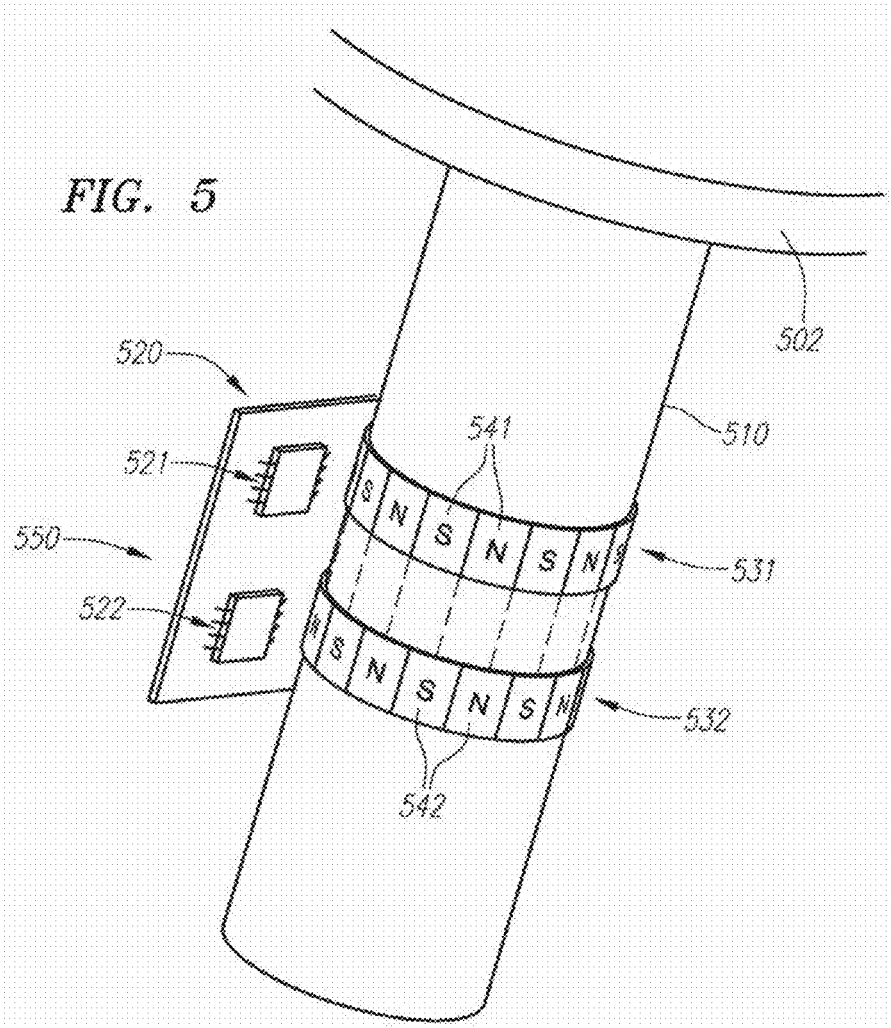
FIG. 5 is a diagram illustrating an example of a steering wheel turn angle sensor system in accordance with one embodiment as disclosed herein.

FIG. 5 is a diagram illustrating an example of a steering wheel turn angle sensor system in accordance with one embodiment as disclosed herein, as may be used in connection with the control system of FIG. 4 or other related systems for controlling headlight fixtures on a vehicle. As shown in FIG. 5, the steering wheel turn angle sensor system includes, in this embodiment, a pair of magnetic collars 531, 532 disposed around a steering wheel shaft 510 or member that rotates in conjunction with the steering wheel shaft, in response to a driver manually turning the vehicle's steering wheel 502. The magnetic collars are proximate to a detection mechanism 550, such as a unit comprising a circuit board 520 having mounted thereon a pair of integrated circuit (IC) sensors 521, 522, each of which is positioned adjacent to one of the magnetic collars 531, 532 for detecting the relative motion thereof. The magnetic collars 531, 532 may each comprise an alternating pattern of oppositely magnetized (north and south) individual magnetic elements 541 or 542, each preferably being the same size. In this example, the magnetic elements 541, 542 are rectangular (or square) in shape. The pattern of the first magnetic collar 531 is preferably offset from the pattern of the second magnetic collar 532, such that the magnetic elements 541 of the first collar 531 are midway between the magnetic elements 542 of the second magnetic collar 532 along the circumferential perimeter of the steering wheel shaft 510.

The IC sensors 521, 522 may each comprise a Hall effect sensor for detecting magnetic flux from each of the magnetic collars 531, 532 as the steering wheel shaft 510 and, hence the magnetic collars 531, 532, are rotated in either direction. The IC sensors 521, 522 may, for example, each constitute a rotary position sensor IC such as a model MLX90316 monolithic sensor IC as manufactured by Melexis Microelectric Integrated Systems of Belgium, or any other suitable IC or other sensor. The IC sensors 521, 522 may provide an output signal in the form of a pulse-width modulated signal or in any other suitable format, which is provided to a controller (such as the control system 410 in FIG. 4) for further analysis and processing. The output signal from IC sensor 521 may be high when the magnetic element 541 proximate the IC sensor 521 is "north" in magnetization and low when the magnetic element 541 proximate the IC sensor 521 is "south" in magnetization.

The controller preferably interprets the output signals representing the magnetic transitions between north and south elements of the magnetic collars 531, 532 in order to determine whether the steering shaft is turning in a right or left direction, and how far the steering wheel has turned in that direction. Each element 541 and 542 of the magnetic collars 531, 532 is of fixed length and corresponds to a predetermined angular displacement of the steering wheel shaft 510 with respect to a reference location, which is the cross-axis traversing the location of the IC sensors 521, 522 in this example. With each north/south or south/north transition, the controller can determine that the fixed angular distance corresponding to a length of one magnetic element 541 or 542 has been traversed, so long as the steering wheel continues to move in the same direction. The direction of travel of the steering wheel shaft 510 can be detected by comparing the output signals from both IC sensors 521, 522 (whereas a single magnetic collar and IC sensor may be insufficient to provide directional information).

Figure 6:
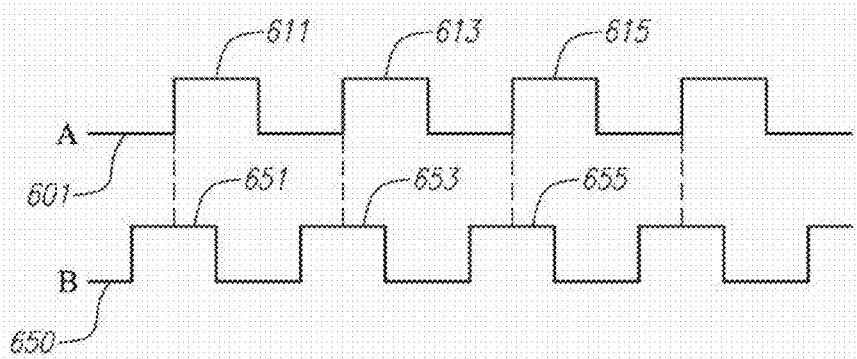
FIG. 6 is a diagram illustrating examples of waveforms as may be detected by the steering wheel turn angle sensor system of FIG. 5.

This operation may be explained with reference to the waveform diagrams of FIG. 6, which represent output waveforms 601, 650 from IC sensors 521 and 522 respectively. As shown in FIG. 6, the output waveform 601 has a series of peaks high pulses 611, 613, 615 that correspond to when the magnetic collar 531 is proximate an element 541 with "north" magnetization, whereas the low values between the pulses 611, 613 and 615 represent the times when the magnetic collar 531 is proximate to an element 541 with a "south" magnetization. Similarly, the output waveform 650 has a series of peaks high pulses 651, 653, 655 that correspond to when the magnetic collar 532 is proximate an element 542 with "north" magnetization, whereas the low values between the pulses 651, 653 and 655 represent the times when the magnetic collar 532 is proximate to an element 542 with a "south" magnetization. The positive transitions in each waveform 601, 650 represent south/north transitions, and the negative transitions in each waveform 601, 650 represent north/south transitions. So long as the waveforms alternative such as shown in FIG. 6, it means that the steering wheel 502 (i.e., steering wheel shaft 510) is continuing to turn in the same direction. If, however, two consecutive transitions occur in the same waveform 601 without an intervening transition in the other waveform 650, or vice versa, this signifies that the steering wheel shaft 510 has changed direction and is turning in the opposite direction. More generally, an even number of transitions occurring in the same waveform before a transition in the other waveform occurs indicates a change in direction, while an odd number of transitions occurring in the same waveform prior to a transition in the other waveform indicate that the steering wheel shaft is continuing to turn in the same direction. Multiple transitions can occur in one waveform 610 or 650 without any transition in the other waveform during periods where the steering wheel is being kept relatively steady along a certain path.

To keep track of the motion of the steering wheel, the controller preferably maintains the current direction of the steering column (clockwise or counter-clockwise, corresponding to right and left respectively) in a working variable or storage element, and further stores the number of transitions offset from the zero point that have been detected. With this information, the controller can determine the precise steering wheel angular position at any given instant in time, and hence the turning direction of the vehicle.

In a preferred embodiment, when the steering wheel sensor system is first employed in the vehicle, the zero point (dead center) of the steering wheel shaft 510 when the vehicle is oriented in a straight and forward direction is measured and durably stored in the controller, for example in a flash memory. At that point in time, the left and right directions for the control signals may also be defined and stored in flash. Preferably, each time the vehicle is stopped the steering wheel column position is saved to durable memory. When the vehicle starts up again, the steering wheel column position is read out from the durable memory and utilized by the controller. In other embodiments, the steering wheel sensor mechanism may be further outfitted with a third magnetic element that denotes the centerpoint of the steering column, to provide an additional mechanical means for determining or verifying the center of the steering wheel shaft 510.

In yet another embodiment, the controller may be provided with a self-calibration routine for calibrating or verifying the calibration of the steering wheel sensor mechanism during operation. In this example, it is assumed that when the vehicle is traveling at a high speed for an extended period and no IC sensor transitions are detected, that it is traveling in essentially a straight line at dead center. For example if the vehicle is traveling over 40 miles per hour for 20 or 30 seconds, it may be assumed to be traveling in a straight line at dead center, and the controller may update its sensor status information accordingly.

Figure 7A:
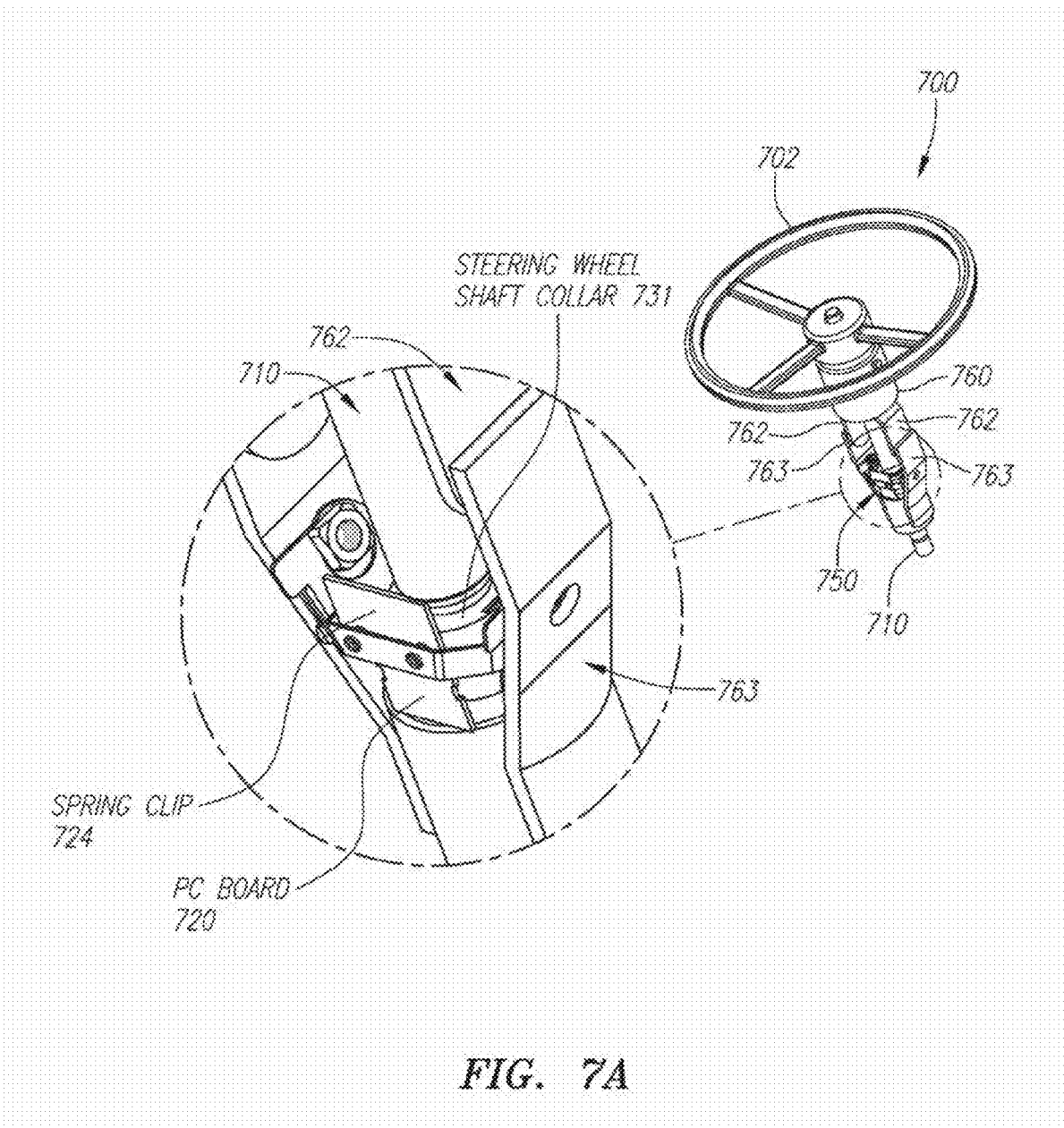
FIG. 7A is an illustration of a preferred embodiment of a steering wheel turn angle sensor system, including an exploded view of a portion thereof.

FIGS. 7A through 7E illustrate a preferred mechanical mechanism for a steering wheel turn angle sensor system as may reflect a particular implementation of the system illustrated in FIG. 5. FIG. 7A shows, for example, a steering wheel 702 mounted to a steering wheel shaft 710, having a steering column enclosure 760 disposed around the upper portion of the shaft 710 proximate the steering wheel 702. The steering column enclosure 760 remains stationary as the steering wheel shaft 710 rotates clockwise or counterclockwise within a central cavity thereof. A steering wheel turn angle detector 750 (such as illustrated in FIG. 5) is disposed proximate to the steering wheel shaft 710, and is secured by an arrangement included a pair of outer arms 763 connected to a collar 775 (see FIG. 7C) surrounding the lower part of the shaft 710 and a pair of upper arms 762 connected to the steering column enclosure 760. The outer arms 763 are securably attachable to the vehicle frame itself, and remain stationary as the steering wheel column 710 rotates. The steering wheel turn angle detector 750, as shown in the exploded view within FIG. 7A, may include a printed circuit board 720 that is attached to the outer arms 763 with a spring clip 724 or other mechanism. A steering wheel shaft collar 731 preferably comprising at least two magnetic collars is preferably disposed around the steering wheel shaft 710 and rotates therewith. The operation of the magnetic collars with respect to IC sensors located on the PC board 720 is preferably similar to the operation as described in connection with FIGS. 5 and 6.

Figure 7B:
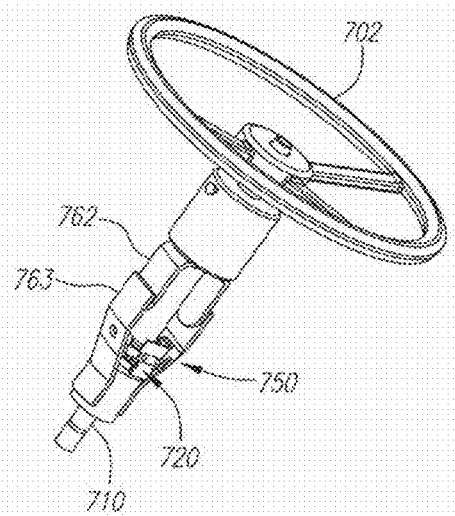
FIGS. 7B and 7C are bottom perspective and bottom views, respectively, of the steering wheel turn angle sensor system of FIG. 7A.
Figure 7C:
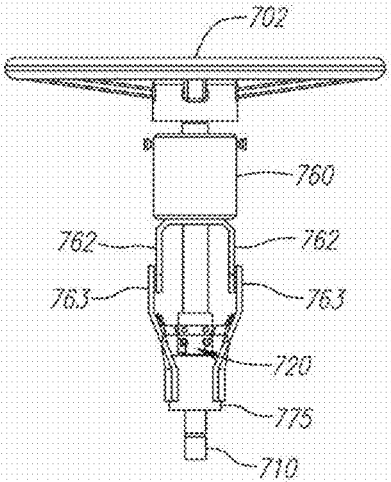
Figure 7D:
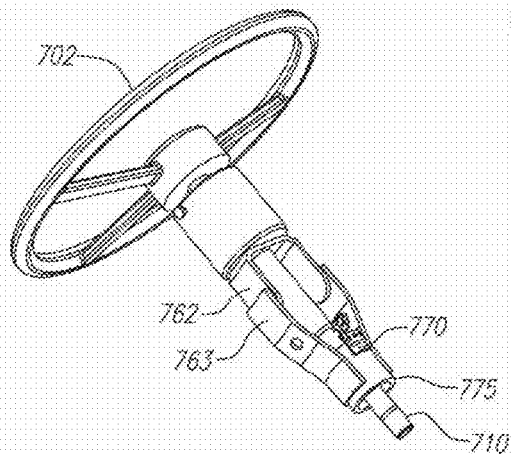
FIGS. 7D and 7E are top perspective and top views, respectively, of the steering wheel turn angle sensor system of FIG. 7A.
Figure 7E:
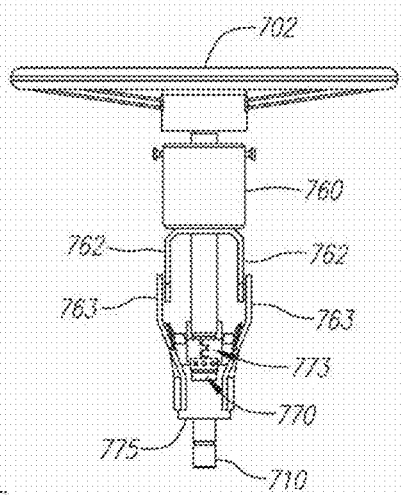

FIGS. 7B and 7C are bottom perspective and bottom views, respectively, of the steering wheel turn angle sensor system of FIG. 7A, showing additional details thereof from other angles, with like components sharing the same reference numbers as in FIG. 7A. Likewise, FIGS. 7D and 7E are top perspective and top views, respectively, of the steering wheel turn angle sensor system of FIG. 7A also showing additional details. Among other things, these figures show a securing member or bracket 770 which securably attaches a protective collar shell 773 to the circuit board 720 to improve the mechanical stability of the components.

Figure 14:
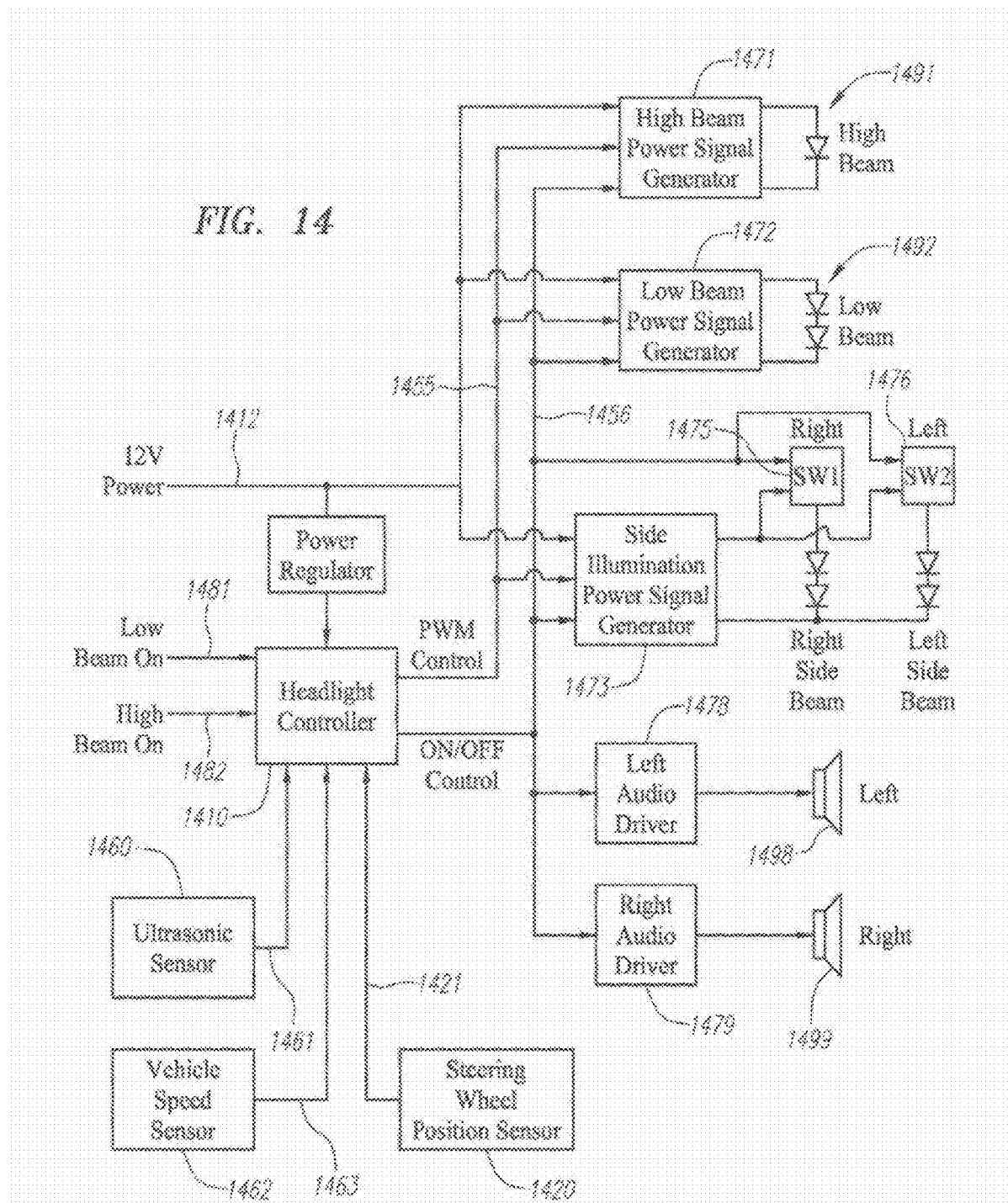
FIG. 14 is a block diagram of a vehicle headlight and alert system in accordance with another embodiment as disclosed herein.

FIG. 14 is a block diagram of a vehicle headlight and alert system 1400 in accordance with another embodiment as disclosed herein, showing the electrical interconnections thereof. As illustrated in FIG. 14, a headlight control module 1430 is connected to a communication bus, such as a Local Interconnect Network bus (LIN-bus) 1431, which is coupled to a vehicle control system 1410. The control system 1410 receives steering angle sensor position signals 1421 from a steering position sensor module 1420, and may also receive a vehicle speed sensor signal 1463 from a vehicle speed sensor 1462 and ultrasonic sensor input signals 1461 from an ultrasonic sensor 1460, if provided. The control system 1410 also receives or is otherwise programmed with programmable parameters (not shown in FIG. 14) such as, for example, threshold or other parameters used for detecting when the vehicle is turning or cornering, and parameters selecting whether the supplemental illumination lights will flash during turning and whether the optional audible sound generators will be utilized. The control system 1410 also receives manual commands 1481 and 1482 for turning the lowbeam and highbeam lights on or off.

The control system 1410 is electrically coupled to a power regulator 1412 that preferably derives power from an onboard battery supply power trunk or cable, such as a 12-Volt battery generated power source. The control system 1410 may be coupled to a power control bus 1455 that provides power signals to downstream components (such as the various headlight modules), and to a selection control bus 1456 that conveys signals for selectively engaging the various headlight modules or elements thereof and, if provided, the audio warning speakers 1498, 1499.

In terms of outputs, the control system 1410 may be operably coupled to a highbeam headlight control module 1471 which may comprise, for example, a boost/buck LED regulator as may be implemented using an LM3429 power controller manufactured by National Semiconductor, controllably connected to a highbeam headlight fixture 1491. The control system 1410 is further operably coupled to a lowbeam headlight control module 1472 which may comprise, for example, a buck LED regulator as may be implemented using an LM3404 power controller manufactured by National Semiconductor, controllably connected to lowbeam power inputs of a multi-mode headlight fixture 1492 which may be embodied, for instance, as the headlight fixture illustrated in FIG. 1-2 or 3A-3E. The control system 1410 is further operably coupled to a side illumination headlight control module 1473 which may comprise, for example, another buck LED regulator as may be implemented using an LM3404 power controller. The side illumination headlight control module 1473 outputs a power signal to a pair of power switches 1475, 1476, which provide outputs respectively to the right side illumination power inputs 1495 and the left side illumination power inputs 1496 of the multi-mode headlight fixture. Power switches 1475, 1476 are operated under control of the control system 1410, and are activated when appropriate to allow the side illumination elements to be turned on. In each case, the control system 1410 provides on/off commands to the highbeam control module 1471, lowbeam control module 1472, and side illumination headlight control module 1473, via the selection control bus 1456, as well as power control (e.g., pulse-width modulation) parameters or control signals via the power control bus 1455.

In addition to the illumination controls, the control system 1410 may also provide output driver signals to the drivers

1478, 1479 for the right audio sound generator (warning speaker) 1498 and left audio sound generator (warning speaker) 1499 respectively.

The control system 1410 thereby may provide comprehensive and flexible control of the illumination and audible components of the headlight and alert system disclosed herein.

In addition, the controller 410 (FIG. 4) or control system 1410 (FIG. 14) may further provide the ability of the headlight to operate as daylight running lights. For example, when the headlights are off, or in response to a manual command, the controller or control system may provide a reduced current to the headlights (for instance, at a 50% level) so that they are operating at approximately at a reduced fraction (e.g., half) of their normal output. The daylight running lights may also be triggered by a light sensor, and operate in conditions approximating normal daytime lighting conditions.

In certain embodiments, multiple light elements (e.g., LEDs) may be oriented in a particular direction. In such a case, the controller may optionally be configured, for example, to activate a first right-facing light element in one or both headlights when the steering wheel has reached a first turning angle (relative to a zero angle) towards the right direction, and activate a second right-facing light element in one or both headlights when the steering wheel has reached a second sharper turning angle towards the right direction. Likewise, the controller may be configured to activate a first left-facing light element in one or both headlights when the steering wheel has reached a first turning angle (relative to a zero angle) towards the left direction, and to activate a second left-facing light element in one or both headlights when the steering wheel has reached as second sharper turning angle towards the left direction. The same principle may be applied for additional light elements, with each added light element or set of light elements triggered by a sharper angle to increase brightness as the turning angle becomes more pronounced.

In one or more aspects of the instant disclosure, a versatile and novel vehicle exterior illumination system and pedestrian alert system is provided. One or more multi-mode lighting fixtures encased in headlight enclosures may be installed in a vehicle, such as a bus or transit vehicle, to provide adaptive forward and side exterior illumination for the vehicle. The adaptive illumination provided by the multi-mode headlight fixtures may be based on LED-type light sources comprising both forward facing LED lights and additional angled LED lights that are selectively activated during a vehicle turn. The angled LED-based lights can, for example, project light in a direction of travel of the vehicle upon detecting a turn to provide advantages including, but not limited to widened peripheral viewing for a driver, greater visual presence to a nearby pedestrian, and ensuring passenger safety upon engaging in a turn or other vehicle movement. The light emitted by the LED-based headlight fixtures may be similar to daylight, which may be gentler on the eyes and therefore increase driver comfort during nighttime operation of the vehicle.

In various embodiments, an LED-based headlight and alert system constructed in accordance with the principles and techniques disclosed herein may exhibit a number of advantages and/or useful characteristics. For example, such a system may provide increased safety and visibility, thus reducing accidents and potential injuries. In addition, the LED headlight fixtures may have a long lifetime because LEDs require less frequent replacement over time as compared with, e.g., incandescent or halogen lights. This can reduce maintenance costs (both replacement component costs and service costs). LED lights are power efficient and thus can result in significant power savings.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A multi-mode headlight system, comprising:
   a headlight enclosure;
   a lowbeam light source within the headlight enclosure;
   a first side illumination light source within the headlight enclosure operable independently from the lowbeam light source;
   a second side illumination light source within the headlight enclosure operable independently from the lowbeam light source and the first side illumination light source; and
   a cover lens attached to the headlight enclosure.

2. The multi-mode headlight system of claim 1, wherein the first side-illumination light source comprises a mounting arm separate from the lowbeam light source coupled to a side light source housing, said side light source housing comprising a hollow cylinder channeling projected light from the first side illumination light source towards the cover lens.

3. The multi-mode headlight system of claim 1, wherein the lowbeam light source comprises one semiconductor light element, and wherein the first and second side illumination light sources each comprise one or more semiconductor light elements.

4. The multi-mode headlight system of claim 3, wherein the semiconductor light elements for the lowbeam light source and the first side illumination light source are light-emitting diodes (LEDs).

5. The multi-mode headlight system of claim 1, wherein the lowbeam light source is oriented so as to project light directly towards the cover lens without reflection.

6. The multi-mode headlight system of claim 1, wherein the lowbeam light source further comprises:
   a lens for adjusting a beam direction and/or spread of light output of the lowbeam light source.

7. The multi-mode headlight system of claim 1, wherein the lowbeam light source comprises at least two semiconductor light elements oriented so as to project light directly towards the cover lens without reflection, and at least two lenses, one for each of the two semiconductor light elements of the lowbeam light source, each lens adapted to adjust a beam direction and/or spread of the light output by the two semiconductor light elements in order to produce a lowbeam light pattern.

8. The multi-mode headlight system of claim 1, wherein the first and second side illumination light sources each comprises one or more semiconductor light elements and wherein the one or more semiconductor light elements of the first side illumination light source is oriented at a first predefined acute angle with respect to a forward-projected beam of the lowbeam light source and towards the right of the headlight enclosure and the one or more semiconductor light elements of the second side illumination light source is oriented at a second predefined angle with respect to the forward-projected beam of the lowbeam light source and towards the left of the headlight enclosure.

9. The multi-mode headlight system of claim 8, wherein each of the first side illumination light source and the second side illumination light source provides a beam spread encompassing at least 20 degrees to 50 degrees relative to a centerline of the projected beam of the lowbeam light source.

10. The multi-mode headlight system of claim 9, wherein each of the first side illumination light source and the second side illumination light source is oriented to project at an angle of approximately 35 degrees relative to a centerline of the projected beam of the lowbeam light source.

11. The multi-mode headlight system of claim 1, wherein the first side illumination light source and the second side illumination light source are each oriented to project non-reflected light directly at a portion of the cover lens.

12. The multi-mode headlight system of claim 1, wherein at least one of the semiconductor light elements of the second side illumination light source is oriented at a predefined acute angle with respect to a forward-projected beam of the lowbeam light source and towards the right of the headlight enclosure, and at least one of the semiconductor light elements of the second side illumination light source is oriented at a predefined acute angle with respect to the forward-projected beam of the lowbeam light source and towards the left of the headlight enclosure.

13. The multi-mode headlight system of claim 1, further comprising:
   a headlight controller for selectively activating the lowbeam light source, for selectively activating the first side illumination light source independently of the lowbeam light source, and for selectively activating the second side illumination light source independently of the lowbeam light source and the first side illumination light source.

14. The multi-mode headlight system of claim 13, wherein the headlight controller is operable to activate the first and second side illumination light sources when the vehicle is running.

15. The multi-mode headlight system of claim 14, wherein the headlight controller is operable to convey an activation signal to the first and second side illumination light sources upon a determination that the vehicle is turning.

16. The multi-mode headlight system of claim 14, wherein the determination that the vehicle is turning is based upon at least a detected vehicle speed and a turn angle.

17. The multi-mode headlight system of claim 16, further comprising:
   a vehicle turn angle sensor coupled to the headlight controller and operable to provide an indication of the vehicle's turn angle.

18. The multi-mode headlight system of claim 17, wherein the headlight enclosure is mounted in a vehicle having a steering wheel shaft, and where the vehicle turn angle sensor further comprises:
   a pair of magnetic collars affixed to the vehicle's steering wheel shaft, and
   a magnetic sensor proximate to each magnetic collar.

19. The multi-mode headlight system of claim 13, wherein the headlight controller comprises a headlight control module coupled to a first power regulator for the lowbeam light source, a second power regulator for the first side illumination power source, and a third power regulator for the second side illumination power source.

20. The multi-mode headlight system of claim 13, further comprising:
   at least one audible sound generator controllably coupled to the headlight controller to project sound from an exterior of the vehicle when the vehicle is turning.

* * * * *